(12) United States Patent
Ishizaki et al.

(10) Patent No.: US 8,456,444 B2
(45) Date of Patent: Jun. 4, 2013

(54) DISPLAY APPARATUS

(75) Inventors: Koji Ishizaki, Aichi (JP); Koji Noguchi, Kanagawa (JP)

(73) Assignee: Japan Display West, Inc., Chita (JP)

( * ) Notice: Subject to any disclaimer, the term of this patent is extended or adjusted under 35 U.S.C. 154(b) by 675 days.

(21) Appl. No.: 12/704,242

(22) Filed: Feb. 11, 2010

(65) Prior Publication Data

US 2010/0225612 A1  Sep. 9, 2010

(30) Foreign Application Priority Data

Mar. 4, 2009 (JP) .................................. 2009-051296
Dec. 25, 2009 (JP) .................................. 2009-296074

(51) Int. Cl.
*G06F 3/044* (2006.01)

(52) U.S. Cl.
USPC ........................................ 345/174; 178/18.06

(58) Field of Classification Search
USPC ..................... 345/173–174; 178/18.01–18.06
See application file for complete search history.

(56) References Cited

U.S. PATENT DOCUMENTS

| 6,078,274 | A | 6/2000 | Inou |
| 7,030,860 | B1 | 4/2006 | Hsu et al. |
| 2006/0038790 | A1* | 2/2006 | Chen et al. .................. 345/173 |
| 2007/0062739 | A1* | 3/2007 | Philipp et al. ............. 178/18.06 |
| 2008/0062139 | A1 | 3/2008 | Hotelling et al. |
| 2008/0266273 | A1* | 10/2008 | Slobodin et al. ............ 345/174 |
| 2009/0188726 | A1* | 7/2009 | Chang et al. .............. 178/18.03 |
| 2010/0013790 | A1* | 1/2010 | Ahn et al. .................. 345/174 |
| 2010/0066700 | A1* | 3/2010 | Mozdzyn ................... 345/174 |

FOREIGN PATENT DOCUMENTS

| JP | 2008-129708 | 6/2008 |
| TW | 2007-42610 | 11/2007 |

* cited by examiner

*Primary Examiner* — Hong Zhou
(74) *Attorney, Agent, or Firm* — Robert J. Depke; The Chicago Technology Law Group, LLC

(57) ABSTRACT

A display apparatus includes: a first and second substrates disposed in an opposing relationship to each other; a plurality of pixel electrodes disposed adjacent the first substrate; a displaying function layer exhibits an image displaying function based on an image signal supplied to the pixel electrodes; a driving electrode disposed in an opposing relationship to the pixel electrodes adjacent one of the two faces; a plurality of detection electrodes disposed on a face of the second substrate on the opposite side to the driving electrode and separated from each other in one direction so as to cooperate with the driving electrode to form capacitance therebetween; and an electrode neighboring layer disposed in contact with the second substrate and the detection electrodes and covering the detection electrodes; the electrode neighboring layer having a refractive index within a range from that of the second substrate to that of the detection electrodes.

19 Claims, 17 Drawing Sheets

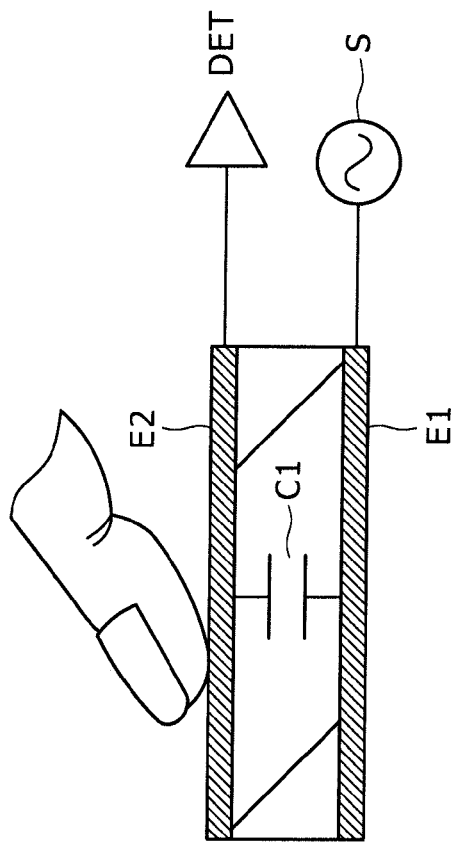
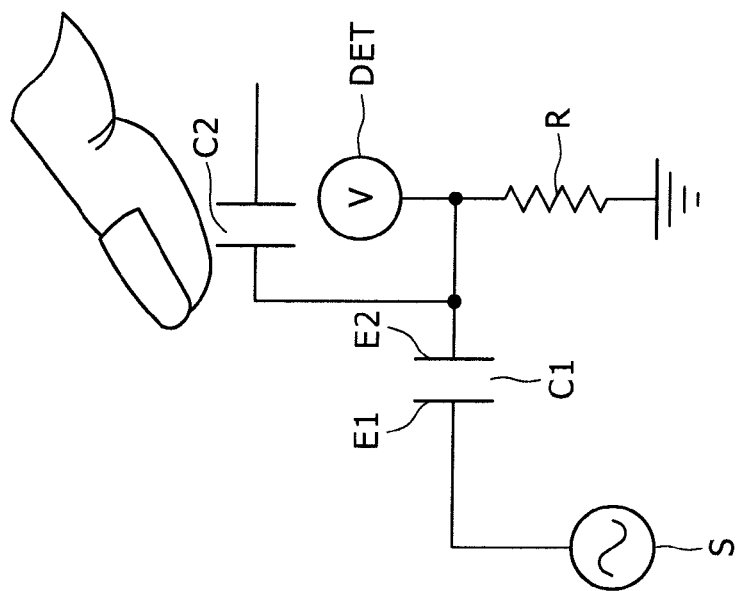
FIG. 2B
FIG. 2A

FIG. 3A Vdet
FIG. 3B Sg (Vcom)
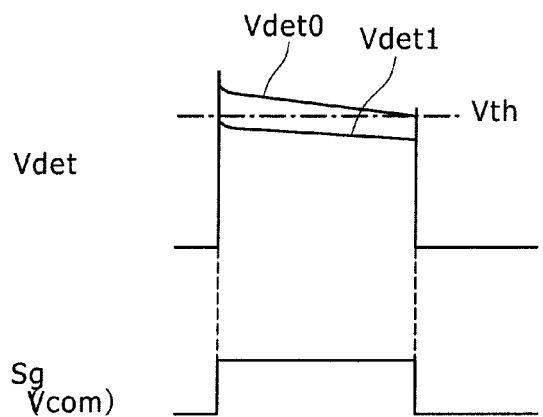
FIG. 3C
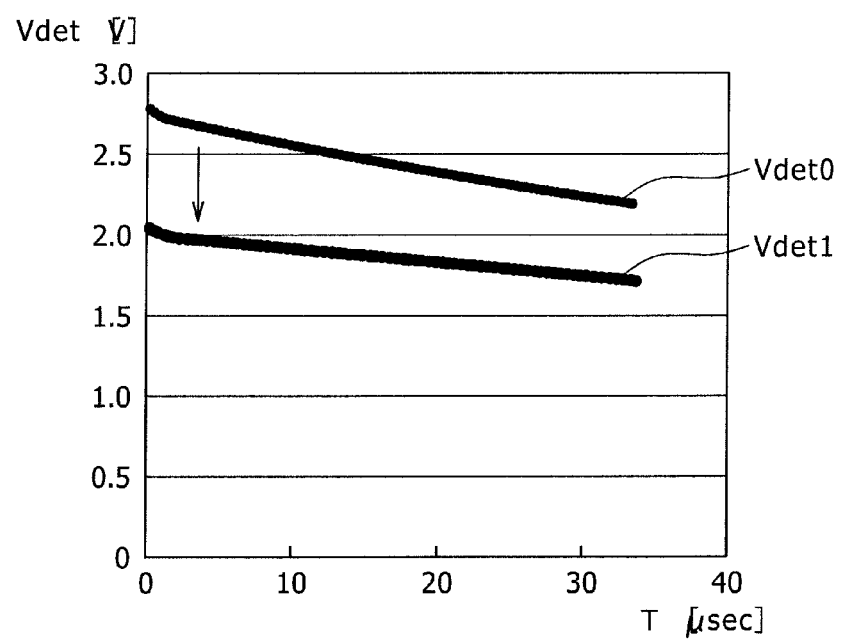

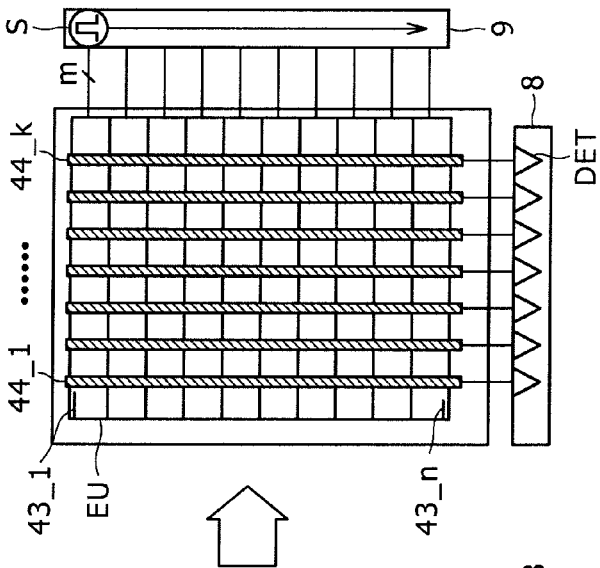
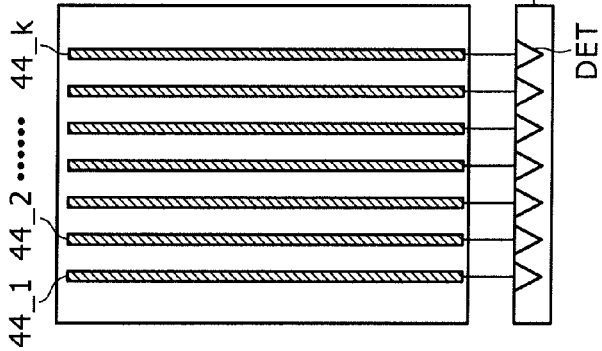
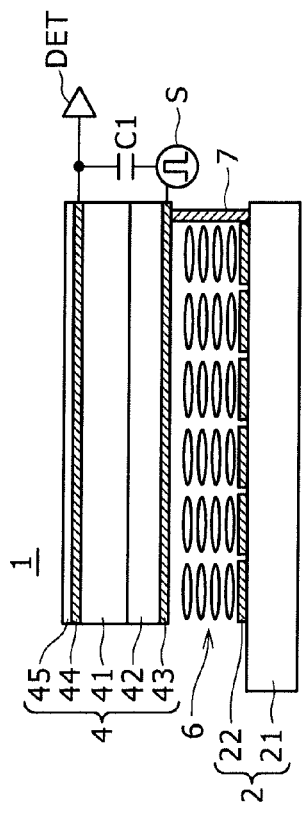
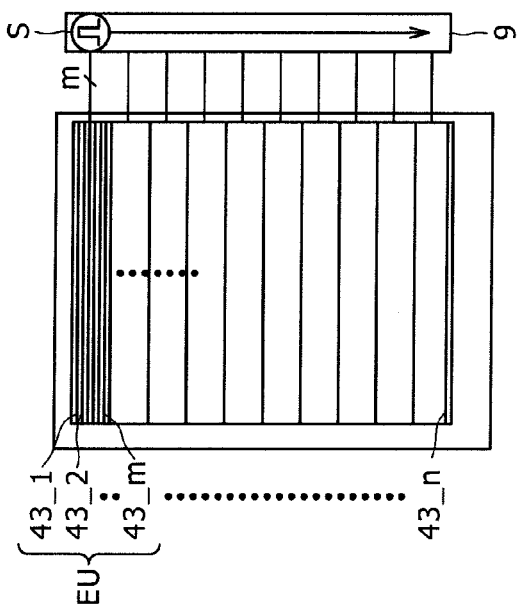

DISPLAY APPARATUS

The present application claims priority to Japanese Patent Application No. JP 2009-051296 filed in the Japan Patent Office on Mar. 4, 2009 and Japanese Patent Application No. JP 2009-296074 filed on Dec. 25, 2009, the entire contents of which is hereby incorporated by reference.

BACKGROUND OF THE INVENTION

1. Field of the Invention

This invention relates to a display apparatus having a touch sensor which can input information by a touch thereof by a user with a finger or the like.

2. Description of the Related Art

Generally, a contact detection apparatus is an apparatus which detects that a finger of a user, a pen or a like element touches with or is positioned in the proximity of a detection face thereof.

A contact detection apparatus called touch panel is known. The touch panel is formed in an overlapping relationship with a display panel such that various buttons are displayed as an image on a display face of the display panel to allow inputting of information through the touch panel in place of ordinary buttons. If this technique is applied to a mobile apparatus of a small size, then such merits as common use of the display apparatus and the button arrangement, increase in size of the screen, space saving of the operation section and reduction of the number of parts are provided.

In this manner, the term "touch panel" generally means a contact detection apparatus of the panel type in combination with a display apparatus.

However, where the touch panel is provided on a liquid crystal panel, the liquid crystal module has an increased overall thickness. Therefore, for example, JP-T-2003-511799 (hereinafter referred to as Patent Document 1) proposes a liquid crystal display device with a touch panel of the capacitance type having a structure suitable for reduction of the device thickness.

A touch sensor of the capacitance type has a driving electrode and a plurality of detection electrodes forming capacitances with the driving electrode.

As an example, it is possible to provide a conductive film, that is, a detection electrode, for a touch panel between an observation side substrate of a liquid crystal display device and an observing polarizing plate disposed on an outer face of the observation side substrate. In this structure, a capacitance type touch panel wherein an outer face of the polarizing plate is used as a touch face is formed between the touch panel conductive film or detection electrode and the outer face of the polarizing plate, and reduction in thickness is achieved.

However, generally a pattern of a driving electrode or a detection electrode is greater than a pixel pitch, and a difference in transmission factor arising from an overlapping manner of electrodes sometimes causes the electrode pattern to be visually perceived through the display face.

Therefore, Patent Document 1 discloses that, for example, in a capacitive type sensor disposed on a display apparatus, a transparent conductor and a substrate are adhered to each other by a bonding agent.

Meanwhile, U.S. Patent Publication No. 2008-0062139 (hereinafter referred to as Patent Document 2) proposes a method of forming a film of ITO on the rear face of a cell of a liquid crystal display apparatus and bonding a polarizing plate to the ITO film.

For the invisualization of an electrode pattern, for example, Japanese Patent Laid-Open No. 2008-129708 (hereinafter referred to as Patent Document 3) discloses a touch panel structure wherein non-conducting transparent electrodes are disposed between patterns upon patterning of detection electrodes so that the transparent electrodes may not be visually recognized by an eye of a person.

If such a countermeasure for the invisualization as disclosed in Patent Document 3 is applied to a touch panel by itself, then the patterns of the transparent electrodes cannot be visually recognized to some degree.

SUMMARY OF THE INVENTION

However, with the technique disclosed in Patent Document 1 mentioned hereinabove, in order to detect two-dimensional coordinate values, it is necessary to dispose a substrate, on which a plurality of transparent conductors juxtaposed in an X-axis direction and a plurality of transparent conductors juxtaposed in a Y-axis direction are to be formed, for example, on a display apparatus. Accordingly, the technique has a problem in that the display apparatus in which a sensor system is incorporated comes to have an increased thickness. Further, Patent Document 1 is silent of an optical characteristic required for the invisualization of a bonding agent for bonding a transparent substrate on which the transparent conductors are patterned directly and another transparent substrate to each other.

Meanwhile, with the technique disclosed in Patent Document 2 mentioned hereinabove, the display apparatus comes to have an increased overall thickness. Further, since the refractive index of a glass substrate and a polarizing plate used in an ordinary display apparatus or liquid crystal display apparatus and ITO increases in order of the polarizing plate, glass substrate and ITO, wiring lines of ITO are liable to be visually observed.

Therefore, it is desirable to provide a display apparatus having a touch sensor function which can implement reduction in thickness of the display apparatus as a whole and implement invisualization of transparent electrode patterns.

According to an embodiment of the present invention, there is provided a display apparatus including a first substrate and a second substrate disposed in an opposing relationship to each other, a plurality of pixel electrodes, a displaying function layer, a driving electrode, a plurality of detection electrodes, and an electrode neighboring layer. The plurality of pixel electrodes are disposed adjacent one of two mutually opposing faces of the first and second substrates, with the one being of the first substrate. The displaying function layer is adapted to exhibit an image displaying function based on an image signal supplied to the pixel electrodes. The driving electrode is disposed in an opposing relationship to the pixel electrodes adjacent one of the two faces of the first and second substrates. The plurality of detection electrodes are disposed on a face of the second substrate on the opposite side to the driving electrode and separated from each other in one direction so as to cooperate with the driving electrode to form capacitance therebetween. The electrode neighboring layer is disposed in contact with the second substrate and the detection electrodes and covering the detection electrodes. The electrode neighboring layer has refractive index within a range from a refractive index equal to that of the second substrate to a refractive index equal to that of the detection electrodes.

In the display apparatus, since the driving electrode is disposed in the first and second substrates which are disposed in an opposing relationship to each other, it eliminates the need for a substrate on which the driving electrode is to be disposed on the outer side of the first and second substrates.

Further, the electrode neighboring layer plays a role for refractive index adjustment to moderate the refractive index difference between the second substrate and the detection electrodes.

According to another embodiment of the present invention, there is provided a display apparatus including a first substrate and a second substrate disposed in an opposing relationship to each other, a plurality of pixel electrodes, a displaying function layer, a driving electrode, a plurality of detection electrodes, and a protective layer. The plurality of pixel electrodes are disposed adjacent one of two mutually opposing faces of the first and second substrates, with the one being of the first substrate. The displaying function layer is adapted to exhibit an image displaying function based on an image signal supplied to the pixel electrodes. The driving electrode is disposed in an opposing relationship to the pixel electrodes adjacent one of the two faces of the first and second substrates. The plurality of detection electrodes are disposed on a face of the second substrate on the opposite side to the driving electrode and separated from each other in one direction so as to cooperate with the driving electrode to form capacitance therebetween. The protective layer is disposed in contact with the second substrate and the detection electrodes and covering the detection electrodes, a refractive index no of the protective layer having such a relationship to a refractive index np of the detection electrode and a refractive index ns of the second substrate as is given, where a wavelength when a refractive index is defined is 550 nm, by the following expression (2)

$$\text{where } np \leq ns, np \leq no \leq ns$$

$$\text{where } np > ns, np \geq no > ns \tag{2}$$

With the display apparatus according to the present invention, reduction in thickness of the entire display apparatus having a touch sensor function can be anticipated and invisualization of transparent electrode patterns is achieved.

The above features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A and 2B are an equivalent circuit diagram and a schematic sectional view, respectively, illustrating operation of the touch sensor section when a finger is contacted with or positioned in the proximity of the touch sensor section shown in FIGS. 1A and 1B, respectively;

FIGS. 3A to 3C are waveform diagrams illustrating input and output waveforms to and from the touch sensor section shown in FIGS. 1A to 1B;

FIGS. 4A to 4C and FIG. 4D are plan views and a schematic sectional view, respectively, illustrating connection of electrode patterns for touch detection and driving circuits for the electrode patterns of the display apparatus shown in FIGS. 1A and 1B;

DETAILED DESCRIPTION OF THE PREFERRED EMBODIMENTS

Figure 1A:
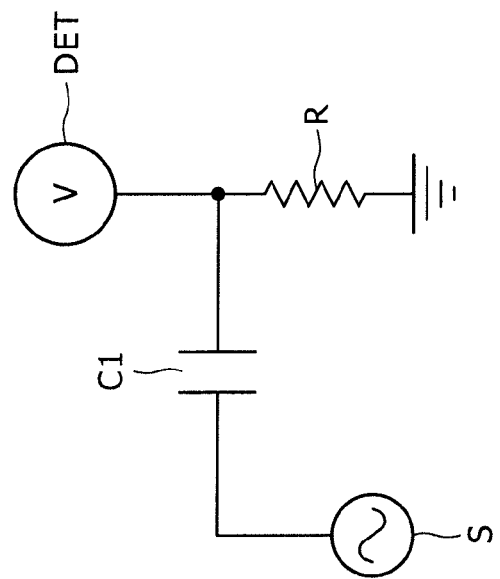
FIGS. 1A and 1B are an equivalent circuit diagram and a schematic sectional view, respectively, illustrating operation of a touch sensor section of display apparatus according to first to eighth embodiments and working examples 1 and 2 of the present invention.

In the following, preferred embodiments of the present invention are described with reference to the accompanying drawings taking a case wherein the display apparatus of the present invention is a liquid crystal display apparatus as an example.

The description is given in the following order.
1. First Embodiment: a refractive index is adjusted through a second substrate, a bonding agent layer and a detection electrode.
2. Second Embodiment: a bonding agent layer is used for pasting of a polarizing plate.
3. Third Embodiment: functions of a bonding agent layer and a polarizing plate are integrated.
4. Fourth Embodiment: a refractive index is adjusted through a second substrate, a protective layer and a detection electrode.
5. Fifth Embodiment: an electrode arrangement example 1 of the first substrate side.
6. Sixth Embodiment: an electrode arrangement example 2 of the first substrate side.
7. Seventh Embodiment: a relationship between a color and a detection electrode is prescribed by a display apparatus.

8. Eighth Embodiment: another particular configuration example of a liquid crystal display apparatus.
9. Working Example 1
10. Working Example 2
11. Application Examples (working examples of an electronic apparatus)

In the following description, a liquid crystal display apparatus with a touch sensor wherein a function of a touch sensor is formed in an integrated relationship with a display panel is taken as an example.

1. First Embodiment

An electrode which is provided in the inner side of a panel with respect to a detection electrode, to which a finger or a like element is to be positioned closely on a display face side, of a touch sensor and which cooperates with the detection electrode to form an electrostatic capacitor for detection therebetween is called driving electrode. Although the driving electrode may be for exclusive use with the touch sensor, as a more desirable configuration for further reduction in device thickness, the driving electrode here is a commonly used electrode which is used commonly for scanning driving of the touch sensor and for VCOM inversion driving of an image display apparatus. It is to be noted that, although the scanning electrode of the touch sensor and the VCOM driving electrode are formed as a single electrode for reduction of the device thickness, the scanning driving of the touch sensor and the VCOM driving themselves are carried out independently of each other as hereinafter described.

The present embodiment is described with reference to the drawings taking the case just described as an example. It is to be noted that, if the term "driving electrode" is merely used, then it is not indefinite to which driving the driving electrode relates, and therefore, the driving electrode is hereinafter referred to as opposing electrode.

[Basic Configuration and Operation for Touch Detection]

First, as common matters to the embodiments described below, a basis of touch detection by the display apparatus of the embodiments is described with reference to FIGS. 1A to 3C.

Figure 1B:
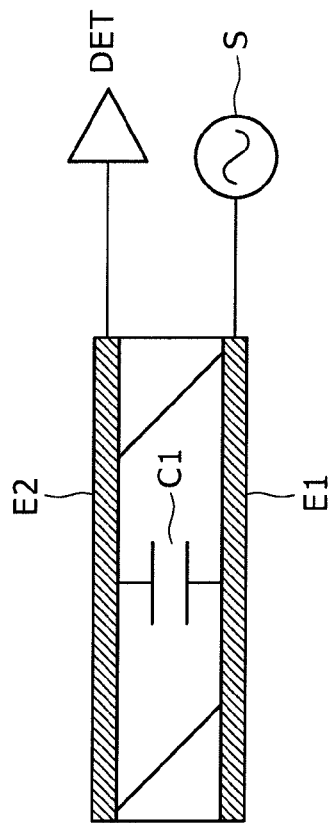

FIGS. 1A and 2A are equivalent circuit diagrams of a touch sensor section, and FIGS. 1B and 2B are schematic sectional views showing a structure of the touch sensor section. Here, FIGS. 1A and 1B illustrate the equivalent circuit and the structure of the touch sensor section, respectively, when a finger as a detection object is not positioned closely to the touch sensor, and FIGS. 2A and 2B illustrate them when the finger is positioned closely to or contacts with the touch sensor.

The touch sensor section shown is a capacitance type touch sensor and is formed from a capacitive element as seen in FIGS. 1B and 2B. In particular, a capacitive element C1, that is, an electrostatic capacitor, is formed from a dielectric member D, and a pair of electrodes, that is, a driving electrode E1 and a detection electrode E2, disposed in an opposing relationship with each other with the dielectric member D interposed therebetween.

As seen in FIGS. 1A and 2A, the capacitive element C1 is connected at the driving electrode E1 thereof to an alternating-current (AC) signal source S which generates an AC pulse signal Sg and at the detection electrode E2 thereof to a voltage detector DET. The detection electrode E2 is grounded through a resistor R so that the DC level thereof is electrically fixed.

An AC pulse signal Sg of a predetermined frequency, for example, of approximately several kHz to several tens kHz is applied from the AC signal source S to the driving electrode E1. A waveform diagram of the AC pulse signal Sg is illustrated in FIG. 3B.

Thereupon, such an output waveform, that is, a detection signal Vdet, as illustrated in FIG. 3A appears at the detection electrode E2.

It is to be noted that, although details are hereinafter described, in the embodiments of the present invention, the driving electrode E1 corresponds to an opposing electrode for liquid crystal driving, which is a common electrode opposing to pixel electrodes and common to a plurality of pixels. For liquid crystal driving, AC driving called Vcom inversion driving is carried out for the opposing electrode. Therefore, in the embodiments of the present invention, a common driving signal Vcom for the Vcom inversion driving is used also as the AC pulse signal Sg for driving the driving electrode E1 for the touch sensor.

In the state illustrated in FIGS. 1A and 1B wherein no finger touches with the display apparatus, the driving electrode E1 of the capacitive element C1 is AC driven, and an AC detection signal Vdet appears at the detection electrode E2 in response to charging and discharging of the capacitive element C1. In the following description, the detection signal at this time is referred to as "initial detection signal Vdet0." Although the detection electrode E2 side is DC grounded, since it is not grounded in a high frequency, no AC discharge path exists and the wave height value of the initial detection signal Vdet0 is comparatively high. However, as time passes after the AC pulse signal Sg rises, the pulse wave height value of the initial detection signal Vdet0 gradually drops due to some loss. FIG. 3C illustrates a waveform in an enlarged scale together with a scale. The pulse wave height value of the initial detection signal Vdet0 exhibits a drop of approximately 0.5 V from 2.8 V of its initial value after lapse of a short period of time due to high frequency loss.

If, in this state, a finger is brought into contact with the detection electrode E2 or moved to a very short distance to the detection electrode E2 at which it has an influence on the detection electrode E2, then the circuit state of the touch sensor section changes to a state equivalent to that in a case wherein a capacitive element C2 is connected to the detection electrode E2 as seen in FIG. 2A. This is because the human body becomes equivalent to a capacitor which is grounded on one side thereof at a high frequency.

In the contacting state, a discharge path for an AC signal including the capacitive elements C1 and C2 is formed. Therefore, upon charging and discharging of the capacitive elements C1 and C2, AC currents I1 and I2 flow to the capacitive elements C1 and C2, respectively. Consequently, the detection signal Vdet0 is divided into a value which depends upon the ratio between the capacitive elements C1 and C2 or the like, and the pulse wave height value thereof drops.

A detection signal Vdet1 illustrated in FIGS. 3A and 3C appears at the detection electrode E2 when a finger touches with the touch sensor section. From FIG. 3C, it can be seen that the dropping amount of the detection signal is approximately 0.5 to 0.8 V.

The voltage detector DET shown in FIGS. 1B and 2B detects the drop of the detection signal using, for example, a threshold value Vth to detect contact of a finger.

[Configuration of the Display Apparatus]

Figure 5:
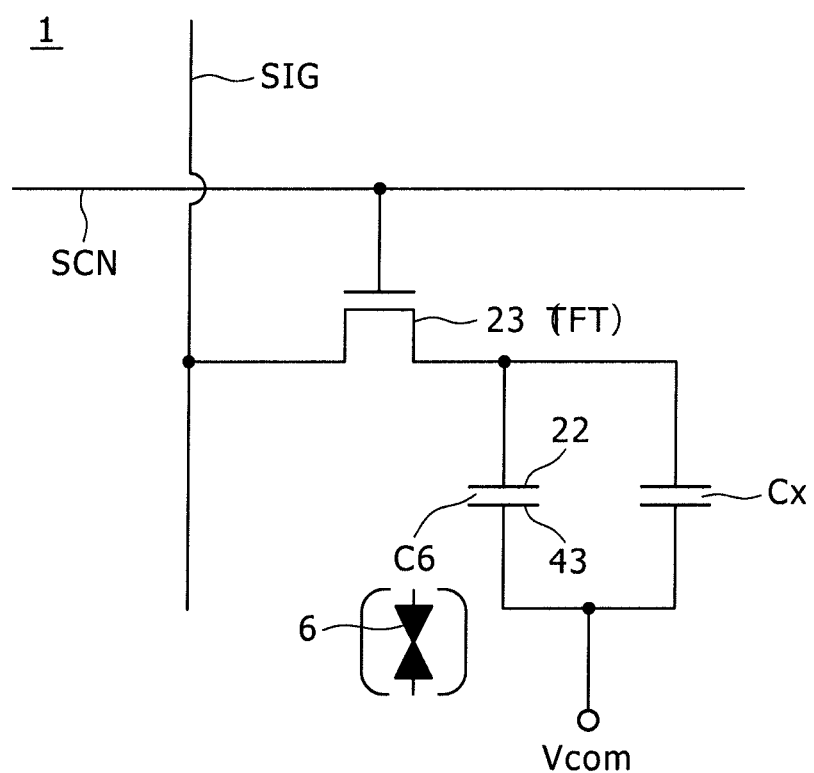
FIG. 5 is an equivalent circuit diagram of a pixel circuit of the display apparatus shown in FIGS. 1A and 1B.

FIGS. 4A to 4C are plan views specifically showing arrangement of electrodes of the display apparatus according to the present embodiment and circuits for driving of and detection by the display apparatus. Meanwhile, FIG. 4D shows a schematic sectional structure of the display apparatus according to the present embodiment. FIG. 4D illustrates, for example, a sectional view of six pixels in a row direction (a direction of pixel display line). FIG. 5 shows an equivalent circuit of a pixel.

The display apparatus shown in FIGS. 4A to 4D is a liquid crystal display apparatus which includes a liquid crystal layer as a "displaying function layer."

The liquid crystal display apparatus has an electrode, that is, an opposing electrode, which is provided on one face side of a liquid crystal layer and is common to a plurality of pixels provided on the other face side of the liquid crystal layer and to which a common driving signal Vcom which provides a reference voltage to signal voltages for gradation display for the individual pixels. In the embodiments of the present invention, the opposing electrode is used as an electrode for sensor driving.

In FIG. 4D, in order to facilitate recognition of the sectional structure, the opposing electrode, a pixel electrode and a detection electrode which are principal components in the present invention are indicated by slanting lines while no slanting line is applied to any other component such as a substrate, an insulating film, a function film and so forth. This similarly applies also to the other like sectional views of the accompanying drawings.

The liquid crystal display apparatus 1 includes a plurality of pixels PIX shown in FIG. 5 which are arranged in a matrix.

Referring to FIG. 5, each pixel PIX includes a thin film transistor (hereinafter referred to as TFT 23) as a select element of a pixel, an equivalent capacitor C6 of a liquid crystal layer 6, and a holding capacitor Cx which is called also additional capacitor. One of electrodes of the equivalent capacitor C6 which represents the liquid crystal layer 6 is one of pixel electrodes 22 which are disposed in a matrix and separated from each other for the individual pixels, and the other electrode of the equivalent capacitor C6 is an opposing electrode 43 which is common to a plurality of pixels.

The pixel electrode 22 is connected to one of the source and the drain of the TFT 23, and a signal line SIG is connected to the other one of the source and the drain of the TFT 23. The signal line SIG is connected to a vertical driving circuit not shown so that an image signal having a signal voltage is supplied from the vertical driving circuit to the signal line SIG.

A common driving signal Vcom is applied to the opposing electrode 43. The common driving signal Vcom has positive and negative potentials with reference to a central potential which appear alternately for every one horizontal period (1H).

The gate of the TFT 23 is electrically common to all pixels PIX juxtaposed in the direction of a row, that is, in a horizontal direction of the display screen thereby to form a scanning line SCN. A gate pulse outputted from the vertical driving circuit not shown for opening and closing the gate of the TFT 23 is supplied to the scanning line SCN. Therefore, the scanning line SCN is called also gate line.

As seen in FIG. 5, the holding capacitor Cx is connected in parallel to the equivalent capacitor C6. The holding capacitor Cx is provided in order to prevent the writing potential from being dropped by leak current of the TFT 23 or the like when the storage capacity of the equivalent capacitor C6 is insufficient. Further, the additional provision of the holding capacitor Cx is effective also to prevention of flickering and improvement of the uniformity of the screen luminance.

The liquid crystal display apparatus 1 having such pixels as described above arranged therein includes, as viewed in a sectional structure thereof shown in FIG. 4D, a substrate (hereinafter referred to as driving substrate) having such TFTs 23 as shown in FIG. 5 formed at locations which do not appear in the sectional view and adapted to receive a driving signal or signal voltage for a pixel supplied thereto. The liquid crystal display apparatus 1 further includes an opposing substrate 4 disposed in an opposing relationship to the driving substrate 2 and a liquid crystal layer 6 interposed between the driving substrate 2 and the opposing substrate 4.

The driving substrate 2 includes a TFT substrate 21 as a circuit board on which the TFTs 23 of FIG. 5 are formed and including a board body section made of glass or the like, and a plurality of pixel electrodes 22 disposed in a matrix on the TFT substrate 21.

Display drivers not shown for driving the pixel electrodes 22 such as a vertical driving circuit and a horizontal driving circuit are formed on the TFT substrate 21. Further, the TFTs 23 shown in FIG. 5 and wiring lines such as the signal lines SIG and the scanning lines SCN are formed on the TFT substrate 21. A detection circuit for carrying out touch detection operation hereinafter described may be formed on the TFT substrate 21.

The opposing substrate 4 includes a glass substrate 41, a color filter 42 formed on one of faces of the glass substrate 41, and an opposing electrode 43 formed on the color filter 42, that is, on the liquid crystal layer 6 side. The color filter 42 is formed from a cyclic array of color filters for three colors of, for example, red (R), green (G) and blue (B), and one of the three colors of R, G and B is associated with each pixel PIX, that is, each pixel electrode 22. It is to be noted that, although a pixel with which one color is associated is called sub pixel and sub pixels of the three colors of R, G and B are sometimes called pixel, also a sub pixel is hereinafter referred to as pixel PIX.

The opposing electrode 43 is used also as a sensor driving electrode which forms part of a touch sensor which carries out touch detection operation, and corresponds to the driving electrode E1 in FIGS. 1B, 2A and 2B.

The opposing electrode 43 is connected to the TFT substrate 21 by a contact conducting post 7. The common driving signal Vcom of an AC pulse waveform is applied from the TFT substrate 21 to the opposing electrode 43 through the contact conducting post 7. The common driving signal Vcom corresponds to the AC pulse signal Sg supplied from the AC signal source S shown in FIGS. 1A to 2B.

A detection electrode 44 is formed on the other face of the glass substrate 41 on the display face side, and a protective layer 45 is formed on the detection electrode 44. The detection electrode 44 forms part of the touch sensor and corresponds to the detection electrode E2 shown in FIGS. 1A, 2A and 2B. A detection circuit for carrying out touch detection operation hereinafter described may be formed on the glass substrate 41.

The liquid crystal layer 6 serves as a displaying function layer and modulates light which passes therethrough in its thicknesswise direction, that is, in an opposing direction of the electrodes, in response to the state of an electric field applied thereto. The liquid crystal layer 6 may be formed from any of liquid crystal materials of various modes such as, for example, a TN (Twisted Nematic) mode, a VA (Vertical Alignment) mode and an ECB (Electrically Controlled Birefringence) mode.

It is to be noted that an orientation film is disposed between the liquid crystal layer 6 and the driving substrate 2 and between the liquid crystal layer 6 and the opposing substrate 4. Further, a polarizing plate is disposed on the opposite side to the display face, that is, on the back face side, of the driving substrate 2 and on the display face side of the opposing substrate 4. The optical function layers mentioned are not shown in FIGS. 4A to 4D.

As shown in FIG. 4A, the opposing electrode 43 is divided in the direction of a row or a column of the pixel arrangement, in the present example, in the direction of a column, that is, in the vertical direction of FIG. 4A. The direction of the division corresponds to the scanning direction of pixel lines in displaying driving, that is, in a direction in which the vertical driving circuit not shown successively activates the scanning lines SCN.

The opposing electrode 43 is divided into totaling n portions. Therefore, the opposing electrodes 43_1, 43_2, . . . , 43_m, . . . , 43_n are disposed in a plane such that they have belt-like patterns elongated in the direction of a row and are laid in parallel to each other and in a spaced relationship from each other in the plane.

The divisional arrangement pitch of the n divisional opposing electrodes 43_1 to 43_n is preferably set to a natural number of times the pixel pitch or sub pixel pitch or of the arrangement pitch of the pixel electrodes.

It is to be noted that reference character "EU" in FIG. 4A denotes a set of m opposing electrodes, m being greater than 2, and AC driving of the divisional opposing electrodes is carried out in a unit of m opposing electrodes. This unit is called AC driving electrode unit EU. The reason why the unit of AC driving is set greater than one pixel line is that it is intended to increase the electrostatic capacity of the touch sensor to raise the detection sensitivity. On the other hand, it is possible to shift the AC driving electrode unit EU by a natural number of times as high as the pixel pitch unit to achieve invisualization of the shift.

Meanwhile, in Vcom driving in a unit of the AC driving electrode unit EU of the opposing electrodes in this manner, the shifting operation is carried out by a Vcom driving circuit 9 as an "AC driving scanning section" provided in the vertical driving circuit, that is, a writing driving scanning section, not shown. The operation of the Vcom driving circuit 9 can be considered equivalent to "moving those AC signal sources S (refer to FIGS. 1A to 2B) which AC drive m wiring lines for different opposing electrodes simultaneously with a potential equal to or different from the Vcom driving voltage in the direction of a column to successively change the opposing electrodes to be selected one by one in the direction of a column."

Although the Vcom driving in electrode driving and invisualization of the driving electrodes themselves by the Vcom driving are preferable, they are not essentially required in the present invention.

The present invention provides a configuration for allowing the opposing substrate 4 to carry out adjustment against the non-uniformity in refractive index on the driving substrate 2 side in order to achieve invisualization of patterns arising from the arrangement of transparent electrodes over the entire display apparatus irrespective of whether or not shift driving is adopted.

As shown in FIGS. 4B and 4C, a sensor detection section 8 is provided together with the Vcom driving circuit 9 in a peripheral region of the display section.

In the following, a circuit configuration of the AC signal source S which generates the AC pulse signal Sg in the Vcom driving circuit 9 and the voltage detector DET which is a basic component of the sensor detection section 8 is described.

[Example of a Basic Configuration of the Driving Section and the Detection Section]

Figure 6:
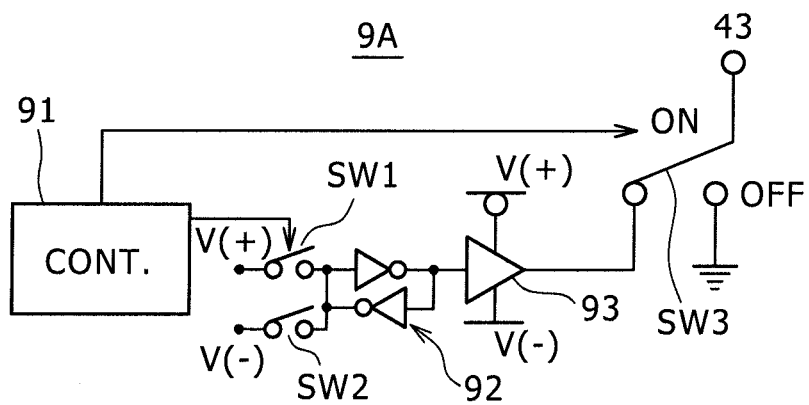
FIG. 6 is a circuit diagram of a sensor driving section of the display apparatus shown in FIGS. 1A and 1B.

FIG. 6 shows a detailed configuration of a sensor driving section 9A which can be used as the AC signal source S (refer to FIGS. 1A to 2B and 4A to 4D) in the embodiments of the present invention.

Referring to FIG. 6, the sensor driving section 9A includes a control section 91, a first switch SW1, a second switch SW2, a latch circuit 92, a buffer circuit 93 and a third switch SW3 and is configured so as to function as an AC driving source. The sensor driving section 9A applies the AC pulse signal Sg (refer to FIG. 3B), which is an AC rectangular wave of a frequency of, for example, several kHz to several tens kHz and is the common driving signal Vcom, to the opposing electrode 43.

The components of the sensor driving section 9A are successively described.

In the sensor driving section 9A, the control section 91 is formed as a circuit for controlling switching operation of the first switch SW1, second switch SW2 and third switch SW3 as seen in FIG. 6.

In the sensor driving section 9A, the first switch SW1 is electrically connected at one of terminals thereof to the latch circuit 92 as seen in FIG. 6. The first switch SW1 is configured such that, when it is placed into an on state by the switching control of the control section 91, a positive voltage V(+) is applied to the latch circuit 92.

In the sensor driving section 9A, the second switch SW2 is electrically connected at one of terminals thereof to the latch circuit 92 as seen in FIG. 6. The second switch SW2 is configured such that, when it is placed into an on state by the control of the control section 91, a negative voltage V(−) is applied to the latch circuit 92.

In the sensor driving section 9A, the latch circuit 92 is electrically connected at an input terminal thereof to the first switch SW1 and the second switch SW2. Further, the latch circuit 92 is electrically connected at an output terminal thereof to the third switch SW3 through the buffer circuit 93.

In the sensor driving section 9A, the buffer circuit 93 is a waveform shaping circuit and is provided as a circuit which compensates for the positive voltage V(+) and the negative voltage V(−) with an in input voltage and outputs a resulting voltage.

In the sensor driving section 9A, the third switch SW3 is controlled to carry out switching operation by the control section 91. Here, when the third switch SW3 is placed into an on state, it is electrically connected to the opposing electrode 43. However, when the third switch SW3 is placed into an off state, it is connected to an inactive ground (GND) level.

The sensor driving section 9A configured in such a manner as described above is provided in a corresponding relationship to each of the plural opposing electrodes 43.

Such a sensor driving section 9A or AC signal source S as described above can be provided so as to configure the Vcom driving circuit 9 (refer to FIGS. 4A and 4C) positioned, for example, around the display region of the driving board of the liquid crystal display apparatus 1. Or, the sensor driving section 9A may be provided around the display region of the opposing substrate 4 as shown in FIG. 4D.

Now, a detailed configuration of the voltage detector DET shown in FIGS. 1A to 2B and 4A to 4D is described.

Figure 7:
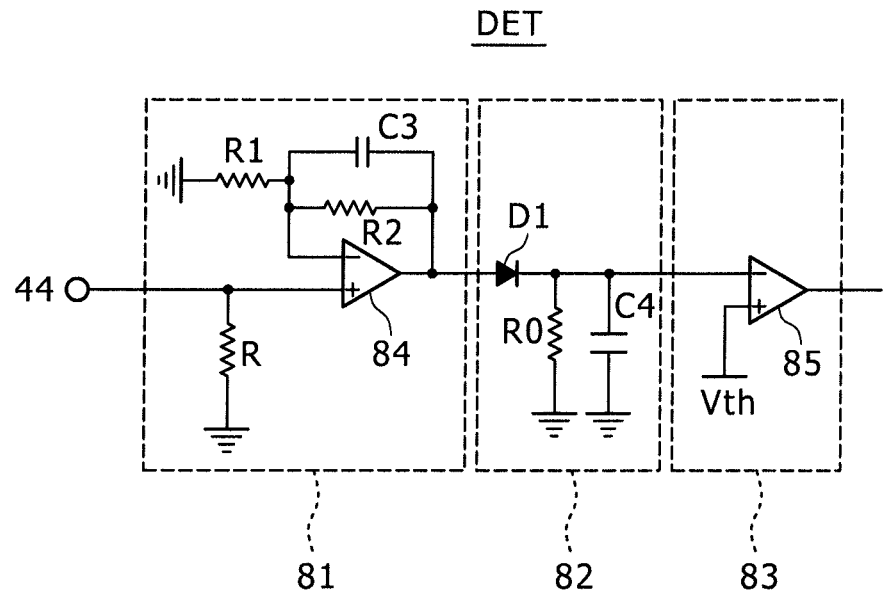
FIG. 7 is a circuit diagram of a voltage detector of the display apparatus shown in FIGS. 1A and 1B.

FIG. 7 shows a circuit configuration of the voltage detector DET in the embodiments of the present invention.

Referring to FIG. 7, the voltage detector DET includes an OP (operational) amplifier circuit 81, a rectification circuit 82, and an output circuit 83.

The components of the voltage detector DET are successively described.

Referring to FIG. 7, in the voltage detector DET, the OP amplifier circuit 81 includes an OP amplifier 84, resistors R, R1 and R2 and a capacitor C3 and is configured so as to function not only as a signal amplification circuit but also as a filter circuit. In particular, the OP amplifier circuit 81 amplifies a detection signal Vdet outputted from the detection electrode 44, removes predetermined frequency components from the detection signal Vdet and outputs a resulting signal to the rectification circuit 82.

In particular, as shown in FIG. 7, in the OP amplifier circuit 81, the detection electrode 44 is electrically connected to a non-negated input "+" of the OP amplifier 84 such that a detection signal Vdet outputted from the detection electrode 44 is inputted to the non-negated input terminal "+" of the OP amplifier 84. Here, the detection electrode 44 is connected to the ground potential through the resistor R in order to electrically fix the DC level of the potential. Meanwhile, the resistor R2 and the capacitor C3 are connected in parallel between the negated input "−" and the output terminal of the OP amplifier 84, and the resistor R1 is connected between the negated input "−" of the OP amplifier 84 and the ground potential.

In the voltage detector DET, the rectification circuit 82 includes a diode D1, a charging capacitor C4 and a discharging resistor R0 as seen in FIG. 7. The rectification circuit 82 is configured such that a signal outputted from the OP amplifier circuit 81 is half-wave rectified by the diode D1 and is then smoothed by a smoothing circuit formed from the charging capacitor C4 and the discharging resistor R0 and then the smoothed signal is outputted to the output circuit 83.

More particularly, in the rectification circuit 82, the diode D1 is electrically connected at the anode thereof to the output terminal of the OP amplifier circuit 81 as seen in FIG. 7. Further, the charging capacitor C4 and the discharging resistor R0 are electrically connected between the cathode of the diode D1 and the ground potential.

In the voltage detector DET, the output circuit 83 includes a comparator 85 as seen in FIG. 7 and is configured such that it functions as an AD converter which converts an analog signal outputted from the rectification circuit 82 into a digital signal.

In particular, as shown in FIG. 7, the comparator 85 is electrically connected at a positive input terminal "+" thereof to the rectification circuit 82. Further, the comparator 85 is connected at a negative input terminal "−" thereof so that a threshold value Vth is inputted thereto. The comparator 85 carries out a comparison process of an analog signal outputted from the rectification circuit 82 with the threshold value Vth and outputs a digital signal based on a result of the comparison process.

Such voltage detectors DET as described above are arranged, for example, in a juxtaposed relationship on one end side in the lengthwise direction of the detection electrode 44 in a peripheral region to the display region on the opposing substrate 4 thereby to form the sensor detection section 8. It is to be noted that the sensor detection section 8 which includes the voltage detectors DET as a basic component may be disposed on the other end side or both end sides of the detection electrode 44. Where the sensor detection section 8 is disposed on the opposite end sides of the detection electrode 44, for example, those voltage detectors DET which correspond to odd-numbered ones of the groups of the detection electrode 44 may be arranged on the one end side in the lengthwise direction of the detection electrode 44 while the voltage detectors DET which correspond to even-numbered ones of the groups of the detection electrode 44 are arranged on the other end side of the detection electrode 44.

[Adjustment Means for the Refractive Index]

Figure 8:
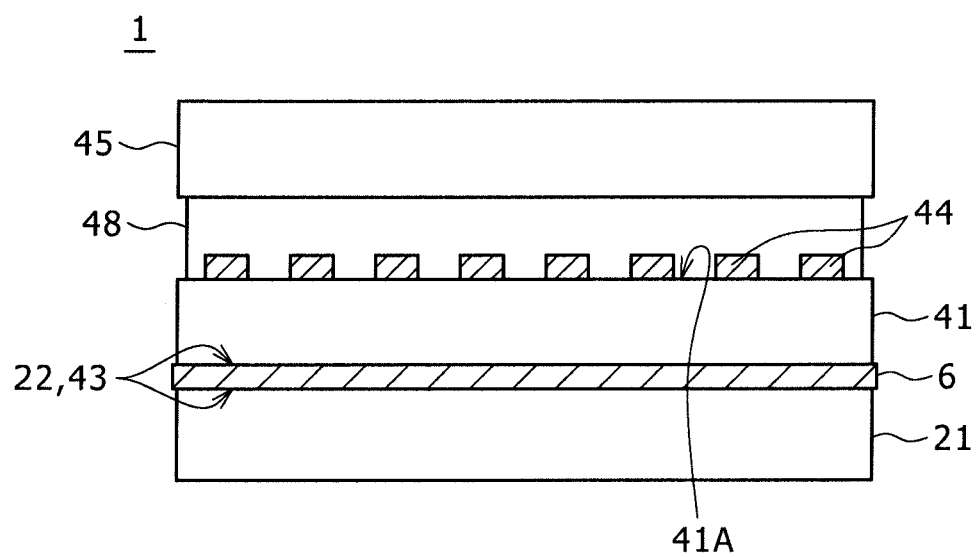
FIGS. 8 to 11 are schematic sectional views of liquid crystal display apparatus according to the first to fourth embodiments of the present invention, respectively, showing a structure on the display face side emphatically.

FIG. 8 is a schematic sectional view wherein particularly the display face side of the liquid crystal display apparatus 1 according to the first embodiment is shown emphatically.

In the sectional structure shown in FIG. 8, common components to those shown in FIG. 4D are denoted by like reference characters. In FIG. 8, the structure of an adhered portion of the detection electrode 44 and the protective layer 45 of FIG. 4D is shown emphatically.

Referring to FIG. 8, in the adhered portion shown, a plurality of detection electrodes 44 are arrayed in an equally spaced relationship from each other on a face of the glass substrate 41 on the opposite side to the liquid crystal layer 6, that is, on a second substrate displaying side face 41A. The detection electrodes 44 are formed from a transparent electrode material and have parallel stripe arrangement elongated in the direction of a column as seen from FIG. 4C. Therefore, a region which does not contact with an electrode material, that is, an inter-electrode region, exists in a gap between each adjacent ones of the detection electrodes 44.

A bonding layer 48 is formed so as to cover over the inter-electrode regions and the detection electrodes 44, and the protective layer 45 is pasted to the bonding layer 48. The protective layer 45 may be formed so as to have a suitable film thickness of approximately 0.1 to 100 μm by various coating techniques using an inorganic material, an organic material or a hybrid material of an inorganic material and an organic material or may be a sheet made of a transparent resin material.

The bonding layer 48 is held in contact with the detection electrodes 44 and the second substrate, that is, the glass substrate 41. Therefore, the bonding layer 48 corresponds to an example of an "electrode neighboring layer." Also in the other embodiments hereinafter described, a layer which contacts with the glass substrate 41 in the inter-electrode regions of the detection electrodes 44 corresponds to an example of the "electrode neighboring layer."

Since the second substrate is not restricted to a glass substrate, in the following description, the same reference numeral "41" is used to represent the second substrate.

Where the detection electrodes 44 and the second substrate 41 have different refractive indexes (and transmission factors) from each other, if they are incorporated in a display apparatus, then since the reflection factor of the detection electrodes 44 and the reflection factor of the second substrate 41 are different from each other, when the display apparatus is viewed particularly at a bright place, the detection electrodes 44 are visually recognized.

The reflection factor at an interfacial boundary between a layer of a refractive index n1 and another layer of a refractive index n2 is given by $(n1-n2)^2/(n1+n2)^2$. Accordingly, the bonding layer 48 which is an electrode neighboring layer has a function of reducing the reflection factor difference between the detection electrodes 44 and the second substrate 41. Therefore, if the refractive index na of the bonding layer 48 is set to a value, preferably to a middle value, between the refractive index np of the detection electrodes 44 and the refractive index ns of the second substrate 41, then the reflection factor difference can be reduced.

If this is represented by an expression, where the wavelength when the refractive index is defined is 550 nm, the relationship between the refractive index na of the electrode neighboring layer, that is, the bonding layer 48, and the refractive index np of the detection electrode 44 and refractive index ns of the second substrate 41 must satisfy the following expression (1):

where $np \leq ns, np \leq na \leq ns$ where $np > ns, np \geq na > ns$           expression (1)

More preferably, the refractive index na is finely adjusted with reference to just the middle between the refractive index np of the detection electrodes 44 and the refractive index ns of the second substrate 41. In many cases, if the refractive index na is set to just the middle between the two refractive indexes, then no great refractive index difference appears.

A particular example of the refractive index na is described.

Where the refractive index of the plate, that is, glass, of the second substrate 41 is 1.52 and the refractive index of the detection electrodes 44 made of ITO is 1.8, the refractive index of the bonding layer 48 ranges preferably from 1.52 to 1.8, and more preferably from 1.6 to 1.7 and ideally from 1.62 to 1.68.

The numerical value ranges given above are applied where the base member on which the detection electrodes 44 are formed is made of glass which is the base material of the second substrate 41. However, in the present embodiment, the face on which the detection electrodes 44 are formed is not limited to a glass face, but, for example, the second substrate displaying side face 41A of the second substrate 41 may be the surface of an insulating film or the like. In such an instance as just described, the substantial refractive index of the second substrate 41 may not necessarily be equal to the refractive index of the base material.

The numerical value ranges given above can be generalized taking such an instance as described above into consideration.

In particular, where the wavelength when the refractive index is defined is 550 nm, the difference between the refractive index ns of the base member, which is the second substrate 41 or the outermost surface layer of the second substrate 41, and the refractive index np of the detection electrodes is represented by $\Delta N$. Where the substrate is made of glass, $\Delta N = 0.28$.

Where this refractive index difference $\Delta N$ is 100%, the refractive index preferably is within a range from −21% to +14% from the center (1.66), in the case wherein the substrate is made of glass, within as range from −0.06 to +0.04, and more preferably is within a range from −14% to +7% from the middle of the refractive index difference $\Delta N$, where the substrate is made of glass, from −0.04 to +0.02.

Where a driving electrode which is a signal electrode layer which forms and detects an electrostatic capacity in the pixel electrode 22, that is, the opposing electrode 43, is included in the display apparatus, according to the present embodiment, the following advantages can be achieved.

In this instance, since the pixel electrodes 22 are so fine that they cannot be dissected by the human eye, it is necessary to achieve the invisualization only by the detection electrodes 44. Where the refractive index of the detection electrodes 44 is defined as given by the expression (1), the refractive index on an interface is uniformized and it becomes difficult to visually recognize the detection electrodes 44 in both of reflection display and transmission display. Thus, the visualization can be achieved even by the detection electrodes 44 themselves.

However, since also the opposing electrode 43 is patterned usually, if the refractive indexes of the second substrate 41, detection electrodes 44 and bonding layer 48 are made fully coincide with each other, then the transmission refractive index difference becomes great. On the other hand, where the amount of external light is great, preferably the reflection factor and refractive index differences are made as uniform as possible. In order to establish a good balance, the refractive index na is preferably set as near as a medium value between the two refractive indexes np and ns which are much different from each other as in the particular example described hereinabove. In particular, where the difference between the refractive indexes np and ns is 100%, the refractive index na preferably falls within a range from −21% to +14% from a medium value, which is a value at 50%, and more preferably is within a range from −14% to +7%.

Further, where the display apparatus in the present embodiment is a liquid crystal display apparatus, since the bonding layer 48, which is an electrode neighboring layer, between the second substrate 41 and the protective layer 45 is used as a member for adjustment of the refractive index in addition to an original function of the bonding layer 48 itself, the display apparatus can be configured while the number of additional members is minimized.

2. Second Embodiment

Figure 9:
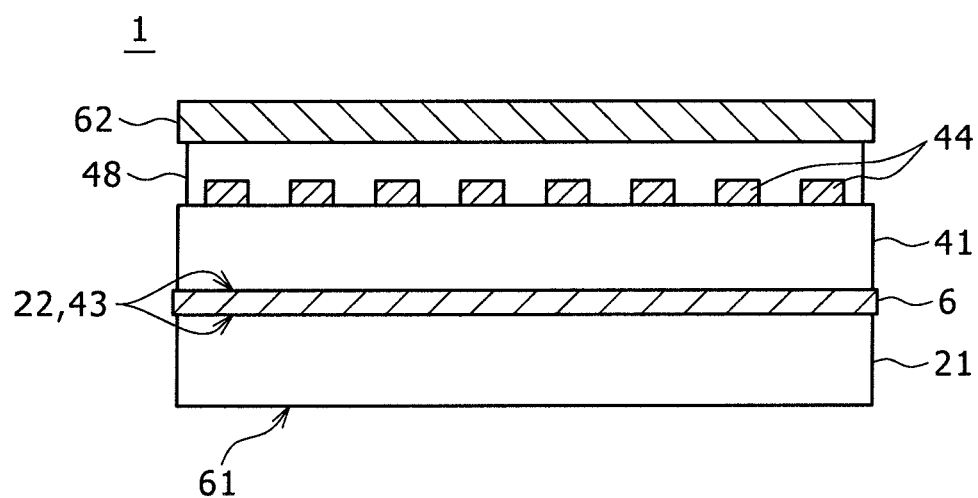

FIG. 9 is a sectional view of a liquid crystal display apparatus 1 according to a second embodiment of the present invention. FIG. 9 emphatically shows the front face side of the liquid crystal display apparatus 1 similarly to FIG. 8.

The liquid crystal display apparatus 1 shown in FIG. 9 is different from that shown in FIG. 8 in that the bonding layer 48 is used to paste a second polarizing plate 62 to the detection electrode formation face of the second substrate 41. Since the provision of the second polarizing plate 62 makes it possible to reduce external light to approximately one half, further invisualization is achieved. Further, since the liquid crystal display apparatus 1 or an organic EL (electroluminescence) display apparatus is sometimes provided with a polarizing plate for image display, the second polarizing plate 62 can be used also for the display object. Although the second polarizing plate 62 may be a linearly polarizing plate, a circularly polarizing plate may be used instead.

With the liquid crystal display apparatus 1 according to the present embodiment, since the second polarizing plate 62 is provided, the reflection factor and the transmission factor are reduced substantially to one half, and consequently, the sensor electrode patterns become less likely to be visually recognized. Particularly where the display apparatus in the present embodiment is the liquid crystal display apparatus 1, since the bonding layer 48 for the second substrate 41 and the second polarizing plate 62 is used also as a member, that is, an electrode neighboring layer, for refractive index adjustment in addition to an original function of the bonding layer 48 itself, the number of additional members can be minimized to configure the display apparatus.

3. Third Embodiment

Figure 10:
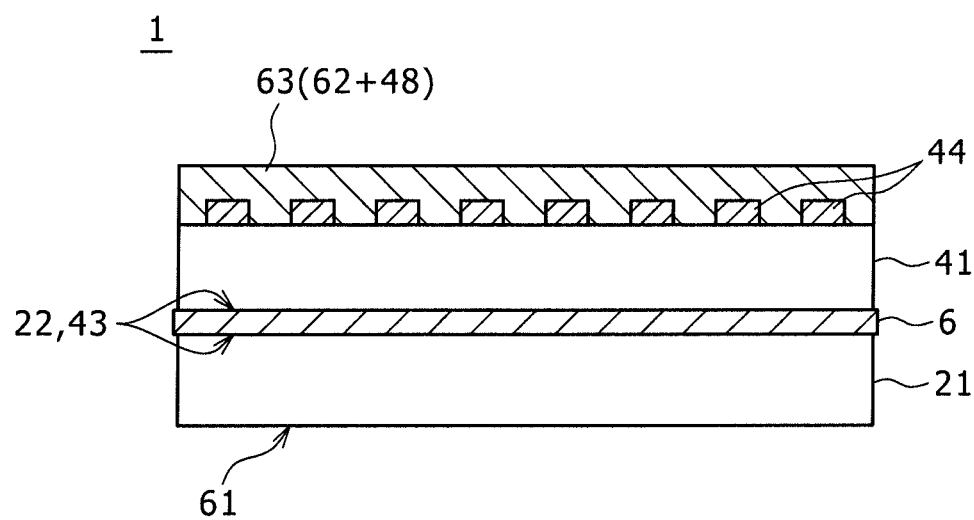

FIG. 10 is a sectional view of a liquid crystal display apparatus 1 according to a third embodiment of the present invention. FIG. 10 emphatically shows the front face side of the liquid crystal display apparatus 1 similarly to FIGS. 8 and 9.

The liquid crystal display apparatus 1 of FIG. 10 is different from that of FIG. 9 in that, in order to form the second polarizing plate 62 directly on the second substrate 41, an electrode neighboring layer 63 wherein an optical function and a refractive index adjustment function are integrated is formed.

With the present embodiment, since the bonding layer 48 is formed as part of a layer which forms the second polarizing plate 62, reduction in device thickness can be anticipated.

Particularly where the display apparatus in the present embodiment is the liquid crystal display apparatus 1, since the second substrate 41 and the electrode neighboring layer 63, which is the bonding layer 48+second polarizing plate 62, are used as a member for refractive index adjustment in addition to original optical functions of the second polarizing plate 62 itself, the display apparatus can be configured using a minimized number of additional members.

As an example of the present third embodiment, it is a possible idea to apply a material having a polarizing function to the inter-electrode regions of the second substrate 41 and the detection electrodes 44 from above.

As the polarizing material to be applied here, for example, such a lyotropic liquid crystal material as is disclosed in Japanese Patent Laid-Open No. 2007-241267 can be used.

Where a liquid crystal material is to be applied, it is necessary to use an orientation film formed by an orientation process by rubbing or the like as a substrate, and by providing an orientation film on a detection electrode formation face, it can be used also as a member for refractive index adjustment.

In particular, the electrode neighboring layer 63 is formed using an orientation film provided between the application type polarizing material and the second substrate 41.

Although the orientation film described above may be formed from any material only if it has a refractive index between those of glass and the detection electrode, polyimide, polyamide, polyvinyl alcohol and so forth are normally used.

In the rubbing process, a rubbing cloth made of a material selected from rayon, cotton, polyamide, polymethyl methacrylate and so forth is to wrap a metal roll, and the metal roll is rotated in a state wherein it contacts with the film, or the film is transported while the roll is fixed. At this time, usually a method of rubbing the film surface is adopted.

The film thickness of the orientation film is preferably set such that the gap between the detection electrodes 44 is filled up and is preferably greater than the thickness of the detection electrodes 44. Further, the application area of the orientation film is preferably disposed such that it covers the effective area or active area of the display apparatus, and in order to achieve invisualization of electrodes outside the effective area, it is more preferable to dispose the application area of the orientation film so as to cover the detection electrodes 44.

The orientation film and the lyotropic liquid crystal can be formed by applying them using various printing apparatus such as a slit coater, a spin coater, a dye coater or a flexographic printer.

4. Fourth Embodiment

Figure 11:
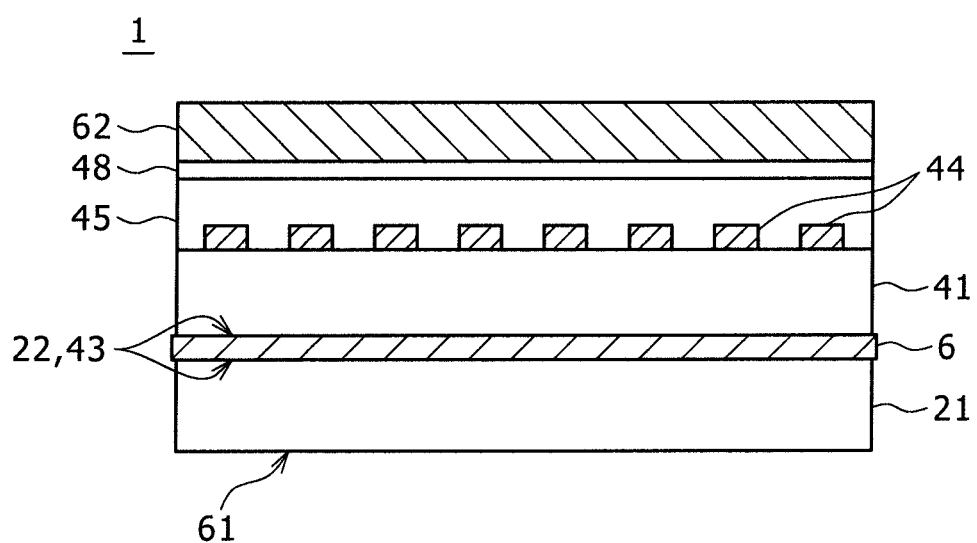

FIG. 11 is a sectional view of a liquid crystal display apparatus 1 according to a fourth embodiment of the present invention. FIG. 11 emphatically shows the front face side of the liquid crystal display apparatus 1 similarly to FIGS. 8 to 10.

The liquid crystal display apparatus 1 of FIG. 11 is different from that of FIG. 9 in that the bonding layer 48 is not formed as an electrode neighboring layer but a protective layer 45 is provided between the bonding layer 48 and the second substrate 41. The protective layer 45 covers the inter-electrode regions of the second substrate 41 and the detection electrodes 44 and functions as an electrode neighboring layer.

The protective layer 45 additionally has a function of protecting the detection electrodes 44 and is preferably formed as a hard layer.

The bonding layer 48 has a function of preventing degradation of the detection sensitivity and scattering by small scratches on the detection electrodes 44. Further, the bonding layer 48 has a function as an electrode neighboring layer, that is, can reduce the reflection factor difference between the second substrate 41 and the detection electrodes 44 by setting the refractive index thereof so as to be included in the same range as that of the bonding layer 48 of FIG. 9.

Further, since the detection electrodes 44 are patterned, although edge portions of the patterns thereof sometimes look scattered, the provision of the protective layer 45 can make the shape of the edges smooth.

If the function of the protective layer 45 as an electrode neighboring layer is represented by an expression, then where the wavelength when the refractive index is defined is 550 nm, the relationship of the refractive index no of the electrode neighboring layer, that is, the protective layer 45, to the refractive index np of the detection electrodes 44 and the refractive index ns of the second substrate 41, must satisfy the following expression (2):

$$\text{where } np \leq ns, np \leq no \leq ns$$

$$\text{where } np > ns, np \geq no > ns \qquad \text{expression (2)}$$

More preferably, the refractive index no is finely adjusted with reference to just the middle between the refractive index np of the detection electrodes 44 and the refractive index ns of the second substrate 41. In many cases, a great refractive index difference does not appear if the refractive index no is set to the middle between the two refractive indexes.

With the liquid crystal display apparatus 1 according to the present embodiment, by the provision of the protective layer 45, invisualized patterns which are superior also in the mechanical strength can be implemented. Further, the protection function of the detection electrodes 44 is enhanced from the electrode neighboring layers of the other embodiments. Therefore, the taper of the sensor section, that is, the pattern edge portion of the detection electrodes 44, can be made smooth and scattering at the edge can be prevented.

By using silicon oxide or silicon nitride itself or using a compound containing silicon oxide or silicon nitride for the protective layer 45, an invisualized pattern superior in mechanical strength can be obtained.

Further, if a compound containing silicon oxide or silicon nitride is used for the bonding layer 48, then the protective layer 45 which has a sufficient strength even if it is thin can be implemented. Consequently, reduced device thickness can be implemented.

5. Fifth Embodiment

The present fifth embodiment and the following sixth embodiment provide a planar electrode arrangement configuration of the detection electrodes 44. In order to achieve invisualization of the electrode patterns over the entire liquid crystal display apparatus 1, also adjustment of the transmission factor in a two-dimensional plane is significant in addition to the adjustment of the transmission factor by the type of the material.

The two embodiments described below exhibit a more significant effect by overlapping application of the first to fourth embodiments described hereinabove. This is because the room for material selection is expanded and further optimization can be made.

Figure 12:
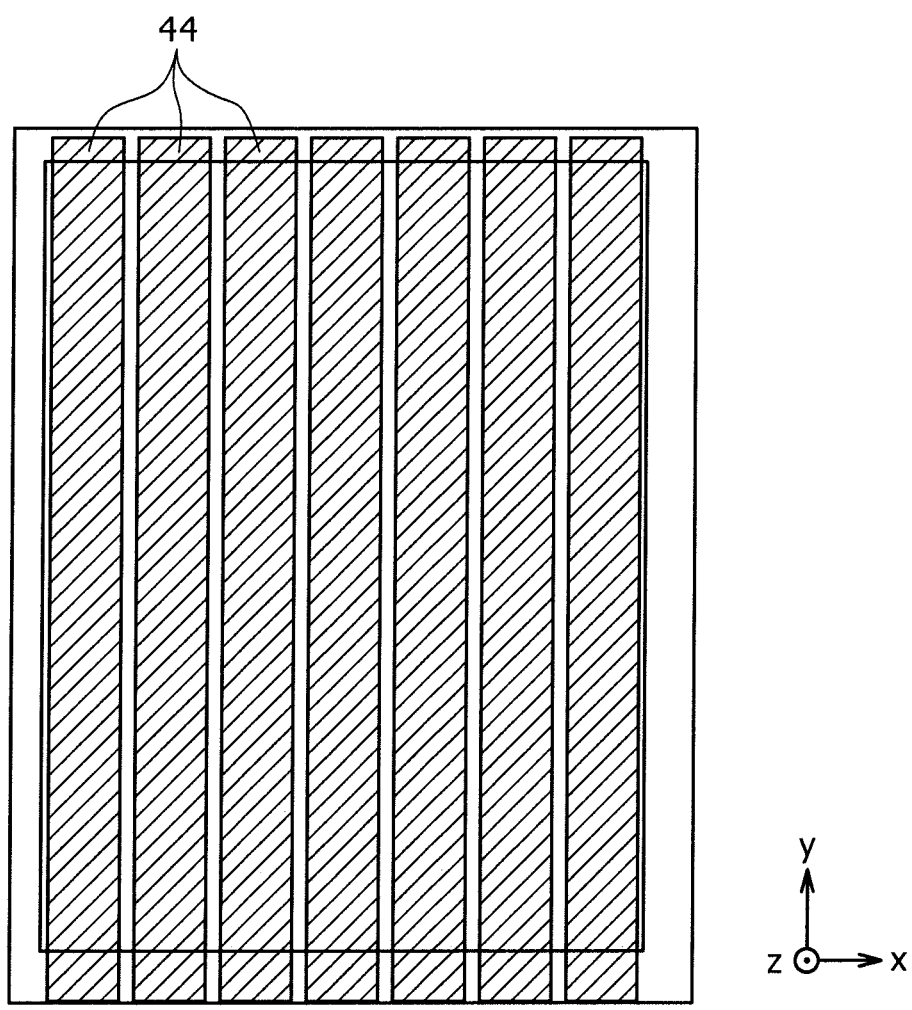
FIG. 12 is a plan view showing a layout of detection electrodes of the liquid crystal display apparatus according to the fifth embodiment of the present invention.

FIG. 12 is a plan view of arrangement of the detection electrodes 44 according to the fifth embodiment.

Referring to FIG. 12, the detection electrodes 44 are filled almost fully in the effective display region of the display section.

Where the non-arranged regions, that is, the inter-electrode regions, between the detection electrodes 44 are reduced to less than 20% of the effective display region, the reflection factor difference between the second substrate 41 and the detection electrodes 44 as viewed in a macroscopic view becomes small and the electrode patterns become further less likely to be visually observed. Particularly, the arrangement pitch of the detection electrodes 44 and the color array by color filters are displaced from each other. In other words, invisualization can be achieved not only in color regions of the same color but also where the overlapping condition with the detection electrodes 44 is different.

6. Sixth Embodiment

Figure 13:
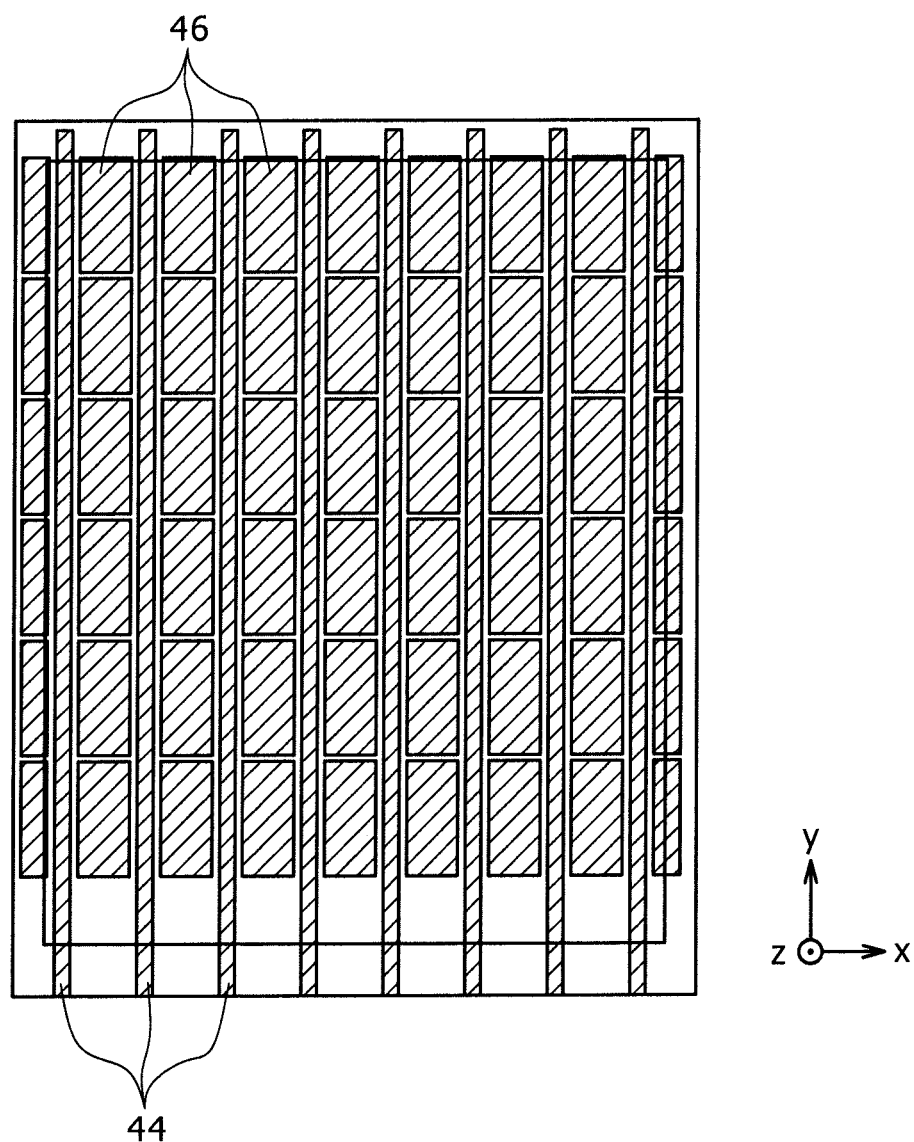
FIG. 13 is a plan view showing a layout of detection electrodes and floating electrodes of the liquid crystal display apparatus according to the sixth embodiment of the present invention.

FIG. 13 is a plan view illustrating arrangement of the detection electrodes 44 according to the sixth embodiment.

Referring to FIG. 13, the detection electrodes 44 have a smaller width in the x direction. This arises from a reason that it is necessary to form the detection electrodes 44 thinner in this manner from a demand for optimization of the electrostatic capacity or from a like reason. In such a case, floating electrodes 46 of the same material as that of the detection electrodes 44 are filled between the detection electrodes 44 in order to raise the filling factor of the transparent electrode material. The floating electrodes 46 are preferably cut in a natural number of times the pixel pitch in the y direction. This is based on a demand that the potential difference between the gaps between the detection electrodes 44 can be transmitted readily through the floating electrodes 46, whose potential is comparatively liable to fluctuate in order to raise the detection sensitivity.

Where the detection electrodes 44 cannot be formed thick from a balance with the detection sensitivity in this manner, it is desirable to dispose the floating electrodes 46.

It is to be noted that the patterns of the floating electrodes 46 are not limited to the example shown in FIG. 13.

[Request for Optimization of the Detection Electrode Width]

Now, a relationship between the width and the detection sensitivity of the detection electrodes 44 and operation of the floating electrode 46 are described.

Figure 14A:
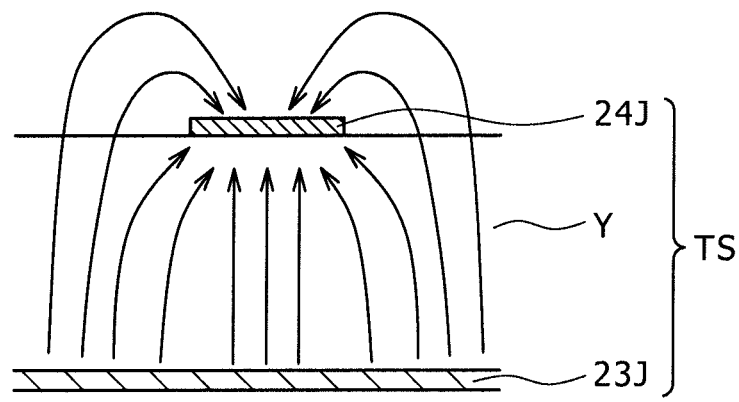
FIGS. 14A and 14B are schematic views illustrating different manners when a touch sensor of the capacitance type is driven.
Figure 14B:
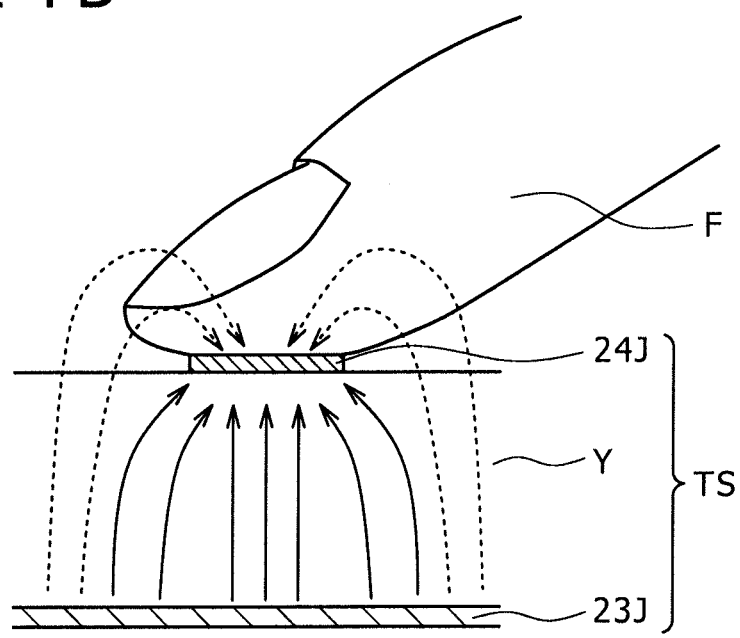

FIGS. 14A and 14B illustrate a manner when a touch sensor TS of the capacitance type is driven. In particular, FIG. 14A illustrates the manner when a detection object F is not positioned in the proximity of the detection face of the touch sensor TS, and FIG. 14B illustrates the manner when the detection object F is positioned in the proximity of the detection face. It is to be noted that, since FIGS. 14A and 14B show a popular touch sensor of the capacitance type, a detection electrode is denoted by reference character "24J."

As seen in FIGS. 14A and 14B, the touch sensor TS of the capacitance type includes a pair of electrodes of a scanning electrode 23J and a detection electrode 24J disposed in an opposing relationship to each other with a dielectric member Y interposed therebetween so as to form a capacitive element.

Where the detection object F is not positioned in the proximity of the detection face, if the common driving signal Vcom is applied to the scanning electrode 23J which is a driving electrode, then an electric field is generated between the scanning electrode 23J and the detection electrode 24J as seen in FIG. 14A.

On the other hand, if the detection object F such as a finger having high electrostatic capacitance is positioned in the proximity of the detection face, then a fringe electric field is intercepted by the detection object F as indicated by broken line arrow marks in FIG. 14B.

Since the fringe electric field is intercepted in addition to an influence of an equivalent capacitive element C2 which the human body has as illustrated in FIG. 2A, the electrostatic capacitance provided by the scanning electrode 23J and the detection electrode 24J varies depending upon whether or not the detection object F exists. The position of the detection face at which the detection object F is positioned closely is detected based on the variation of the electrostatic capacitance.

Such a touch sensor of the capacitance type as described above does not sometimes have a sufficiently high detection sensitivity and it is sometimes difficult to carry out detection of a touched position with a high degree of accuracy. Therefore, in the present embodiment, the floating electrode 46 is provided to achieve improvement of the sensitivity.

More particularly, where the electrostatic capacitance provided by the scanning electrode and the detection electrode is significantly low with respect to the parasitic capacitance of the detector (voltage detector DET shown in FIGS. 4A to 4D and so forth), the detection may not be carried out appropriately. Therefore, it becomes necessary to increase the width of the detection electrode 24J. However, in this instance, since a fringe electric field is intercepted by the thick detection electrode 24J, improvement of the detection sensitivity is canceled by a corresponding amount or the detection sensitivity may be degraded conversely.

Where the detection electrode 24J is formed as a transparent electrode of ITO (Indium Tin Oxide) or the like, if it is tried to assure a higher degree of transparency, then since the specific resistance of the detection electrode increases, increase of the time constant occurs. Therefore, the detection time may become longer.

In this manner, with a touch sensor, it is sometimes difficult to carry out detection with a high degree of accuracy because the detection sensitivity is not sufficient and the detection time is long.

From such various requests as described above, the detection electrode width is optimized. However, according to circumstances, the detection electrode width is comparatively small while the gap between the detection electrodes is great. In such a case as just described, if floating electrodes are arranged in a line between the detection electrodes for the object of invisualization, then since the floating electrode capacitance is high, there is a tendency that a fringe electric field is intercepted.

The present embodiment is advantageous in that, by dividing the floating electrodes 46 into small pieces, the interception of a fringing electric field can be reduced to improve the sensitivity and achieve invisualization of the floating electrode 46.

7. Seventh Embodiment

Figure 15:
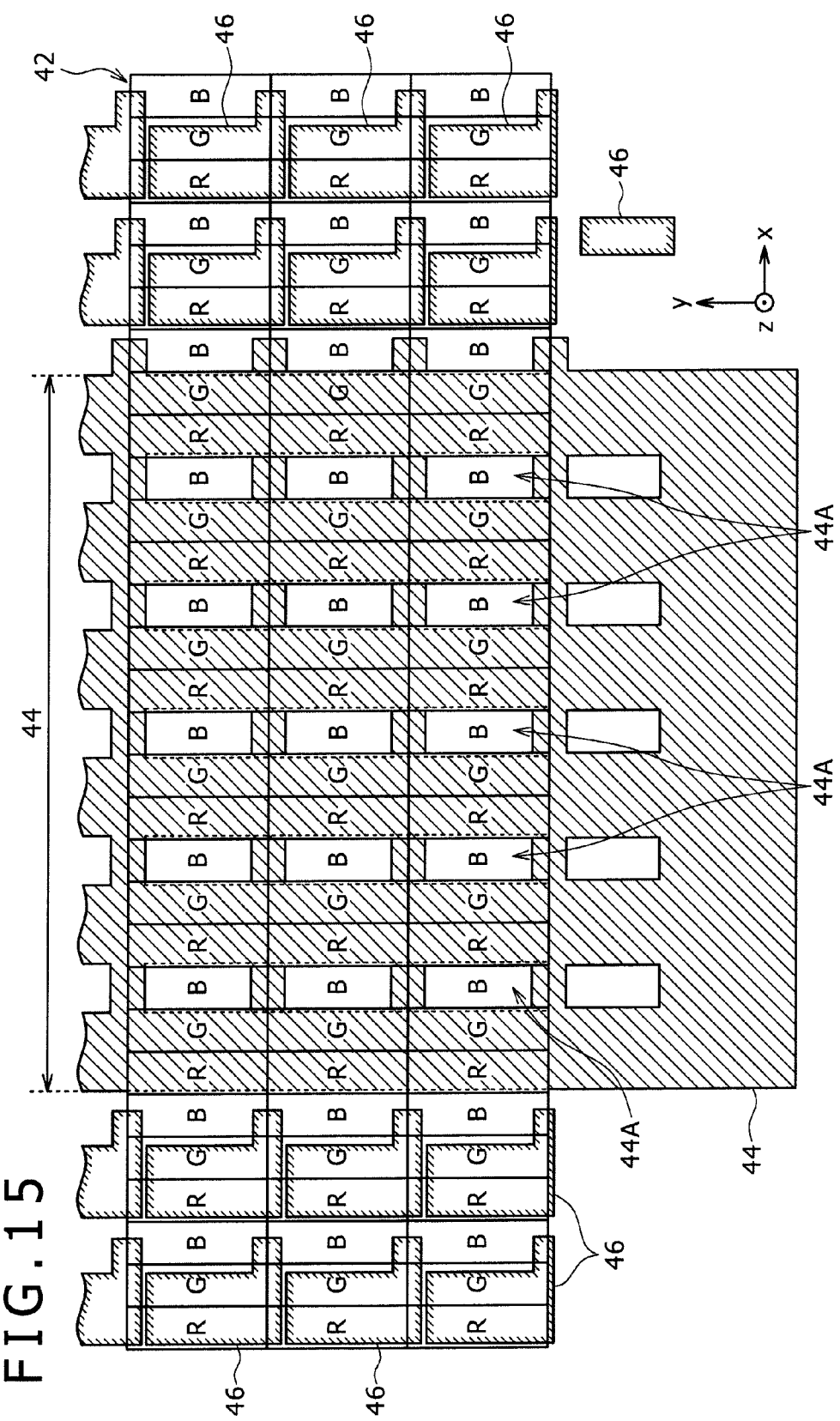
FIG. 15 is a transparent plan view of a liquid crystal display apparatus according to the seventh embodiment of the present invention.

FIG. 15 is a transparent plan view of a liquid crystal display apparatus according to a seventh embodiment of the present invention. FIG. 15 is a transparent plan view of the opposing electrode 43 and the detection electrode 44, for example, shown in FIG. 4D as viewed from the rear face side, that is, from below the lower face side of the TFT substrate 21. FIG. 15 only shows, from among various patterns, a color filter 42, a detection electrode 44, and floating electrodes 46.

In the present embodiment, a plurality of openings 44A are provided in the detection electrode 44 in accordance with a color array of the color filter 42. The openings 44A have a size and arrangement corresponding to filter portions of one color or a plurality of colors.

In the example of FIG. 15, the color filter 42 has a striped array wherein filter portions of the three primary colors are arrayed in repetitions of red (R), green (G) and blue (B) in an x direction and are each formed long in a y direction. Further, in the present example, only the filter portions of blue (B) do not overlap with the detection electrode 44. In other words, the openings 44A of the detection electrode 44 are provided such that the filter portions of blue (B) are exposed therefrom. It is to be noted that the color of such filter portions which do not overlap with the detection electrode 44 may be different from blue (B).

In the present example, based on the situation that the transmission factor of light of blue (B) through a transparent electrode material from which the detection electrode 44 is formed is lower than those of light of the other colors, it is intended to position each light emitting region of blue (B) so as not to correspond to the detection electrode 44 made of a transparent electrode material thereby to raise the emitting efficiency of light of blue (B). By the configuration, the light transmission factors of the different colors can be made equal to each other.

It is to be noted that, where some other situation is applicable, the relationship between a color and the detection electrode 44 can be set arbitrarily in accordance with the situation.

It is to be noted that the color array of the color filter 42 is not limited to a parallel striped array. As a color array other than the parallel striped array, the wiring line pattern of the detection electrode 44 may be set such that the detection electrode 44 is formed meandering so as to bypass a certain color such as blue (B) in the array of FIG. 15.

That the wiring line pattern of the detection electrode 44 may be any other than the parallel striped array such as meandering of the detection electrode 44 can be applied also to the other embodiments.

In FIG. 15, the color filter 42 of a parallel striped array is assumed, and totaling 15 openings 44A are arrayed in a similar shape and in a spaced relationship from each other such that five openings 44A are arranged in the widthwise direction of the detection electrode 44, that is, in the x direction and three openings 44A are arranged in the lengthwise direction, that is, in the y direction. The number of openings in the electrode widthwise direction may be different from 5 if the width of the detection electrode 44 is different and may be determined arbitrarily. Further, in FIG. 15, the number in the lengthwise direction is equal to the number of pixels in the vertical direction, that is, in the y direction, in the detection region. It is to be noted that such modification as to provide an opening 44A for every two pixels in the y direction or for every greater plural number of pixels may be applied.

In FIG. 15, the floating electrodes 46 are disposed separately in the y direction on the opposite sides of one detection electrode 44 in the x direction. The floating electrodes 46 are disposed such that they substantially fill up two regions between detection electrodes which do not appear in FIG. 15 similarly as in FIG. 13. In FIG. 15, the floating electrodes 46 are filled up separately for individual pixel trios of R, G and B in a shape wherein portions thereof corresponding to blue (B) lack in order to improve the transmission factor for blue (B).

Where to reduce the area of each floating electrode 46 contributes to improvement in sensitivity through reduction of the interception of a fringing electric field as described hereinabove, it is desirable to divide the floating electrodes 46 into portions as small as possible. Accordingly, the floating electrode 46 may be divided for each pixel, for example, for one color portion of the color filter 42. In this instance, as with the arrangement for pixel trios in FIG. 15, for pixels of any color with regard to which arrangement of the floating electrode 46 decreases the transmission factor such as pixels of blue (B), it is desirable not to dispose the floating electrode 46.

In the seventh embodiment described above, the floating electrodes 46 can be provided to increase the fringing capacitance to improve the sensitivity. Simultaneously, a multiplier effect that the light transmission factor in a wavelength band of a color with regard to which the transmission factor is low, for example, in the wavelength band of blue (B), is improved is achieved. Further, by covering the floating electrodes 46 or the detection electrodes 44 in which the openings 44A are provided for the improvement of the light transmission factor with an electrode neighboring layer, invisualization of the floating electrodes 46 and the detection electrodes 44 can be anticipated.

8. Eighth Embodiment

FIGS. 16 to 19 show examples of the structure of a transverse electric field mode liquid crystal display apparatus.

In the structure shown in FIGS. 4A to 4D, the pixel electrodes 22 and the opposing electrode 43 are opposed to each other with the liquid crystal layer 6 interposed therebetween such that a longitudinal electric field is applied to the liquid crystal layer 6 in response to an applied voltage between the two electrodes.

In the transverse electric field mode, the pixel electrodes 22 and the driving electrode, that is, the opposing electrode 43, are disposed on the driving substrate 2 side.

In the structures of FIGS. 16 to 19, the opposing electrode 43 is arranged on the face of the TFT substrate 21 on the front face side, that is, on the display face side, and the opposing electrode 43 and the pixel electrodes 22 are positioned adjacent each other with an insulating layer 24 interposed therebetween. The opposing electrode 43 is arranged in lines elongated in the direction of the display lines, that is, in the x direction, and the pixel electrodes 22 are separated for individual pixels from each other in the direction.

The TFT substrate 21 is adhered to the second substrate 41 with the pixel electrodes 22 side thereof positioned adjacent the liquid crystal layer 6. The liquid crystal layer 6 is held in strength by a spacer not shown.

Figure 16:
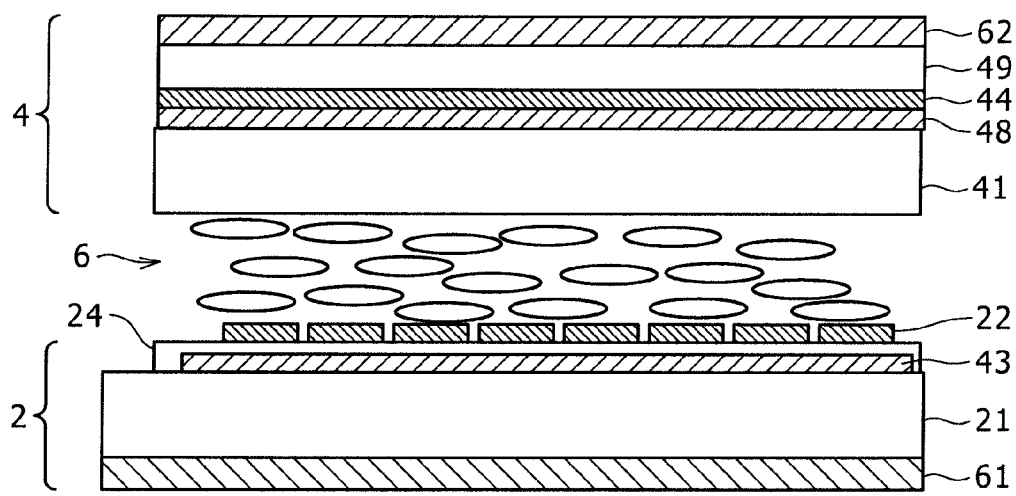
FIGS. 16 to 19 are schematic sectional views showing different examples of a configuration of a liquid crystal display apparatus according to the eighth embodiment of the present invention.
Figure 17:
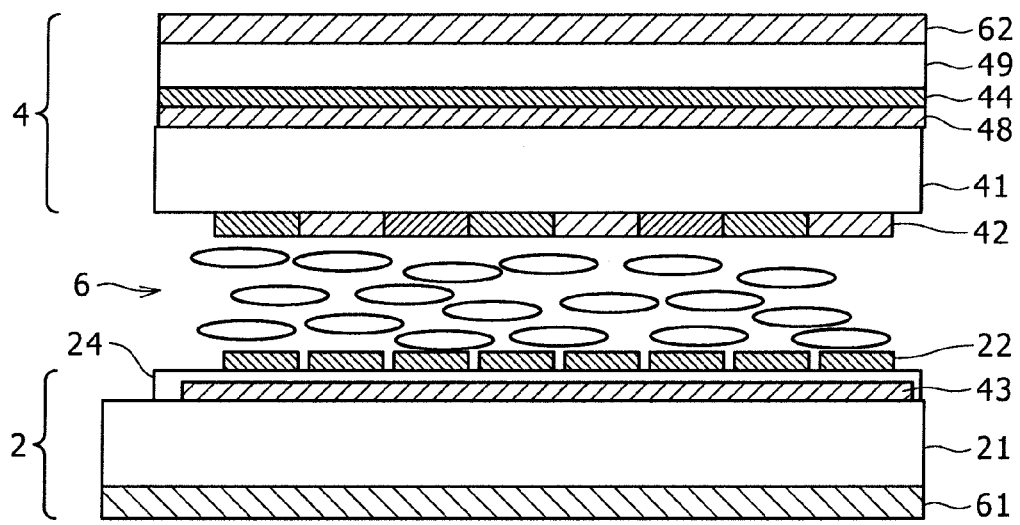

Referring to FIGS. 16 and 17, reference numeral "49" denotes a substrate on the display face side such as a glass plate or a transparent film. The detection electrodes 44 are formed on one of the opposite faces of a substrate 49. The detection electrodes 44 held on the substrate 49 are secured to the face of the second substrate 41 opposite to the liquid crystal side by the bonding layer 48.

Meanwhile, a first polarizing plate 61 is pasted to the rear face of the TFT substrate 21, and a second polarizing plate 62 having a different polarization direction is pasted to the display face side of the substrate 49.

A protective layer not shown is formed on the display face side of the second polarizing plate 62.

The pixel electrodes 22, opposing electrodes 43 and detection electrodes 44 are preferably formed from a transparent electrode material. The transparent electrode material may be ITO or IZO or else an organic conductive film.

The transmission factor preferably is higher than 95% within the wavelength range of 450 to 650 nm, and if the transmission factor is lower, then even if the refractive indexes are adjusted, the electrodes look like stripes.

The bonding layer 48 is preferably formed from a bonding agent having a high refractive index.

The liquid crystal layer 6 modulates the polarization state of light which passes therethrough in response to the state of the electric field. Liquid crystal of the transverse electric field mode such as, for example, the FFS (Fringe Field Switching) mode or the IPS (In-Plane Switching) mode is used preferably.

In the structure shown in FIG. 17, the color filter 42 is formed in advance on the liquid crystal side of the second substrate 41. In the color filter 42, color regions different from each other for individual pixels or sub pixels are arranged regularly.

Figure 18:
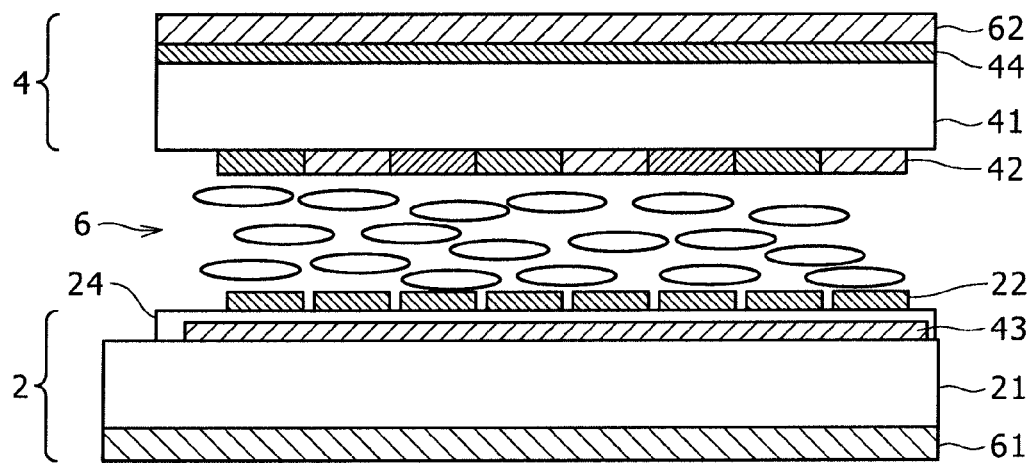

The structure shown in FIG. 18 is different in the lamination structure on the display face side from the structure shown in FIG. 17.

While, in the structure shown in FIG. 17, the detection electrode 44 is formed in advance on the substrate 49 and is pasted, for example, as a member in the form of a roll, in the structure shown in FIG. 18, the detection electrode 44 is formed on the display face side of the second substrate 41 and the second polarizing plate 62 is pasted to the detection electrode 44.

Figure 19:
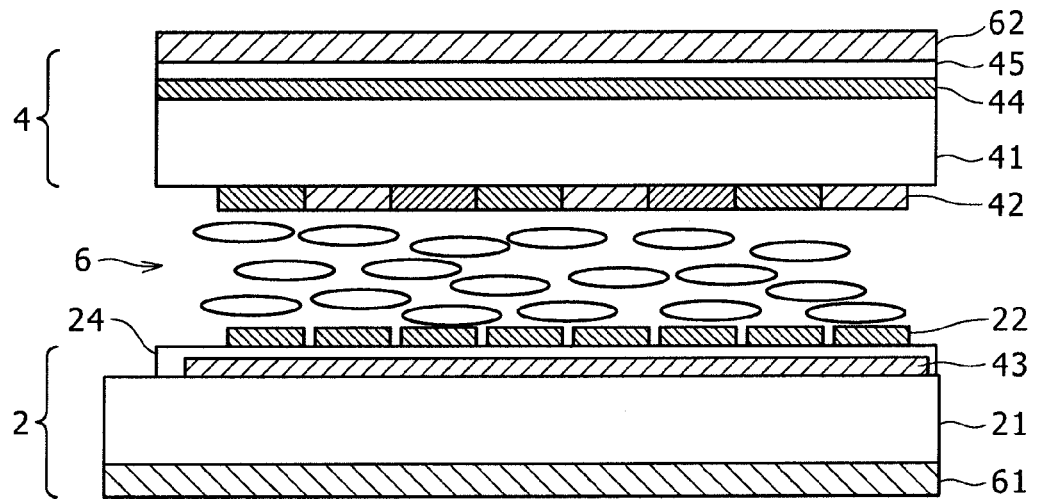

While, in the structure of FIG. 18, the second polarizing plate 62 and the detection electrode 44 contact closely with each other, in the structure shown in FIG. 19, the protective layer 45 is interposed between the second polarizing plate 62 and the detection electrode 44. Details of the structure are shown in FIG. 11.

It is to be noted that, with the structures of FIGS. 16 and 17 which include the bonding layer 48, further invisualization of the electrode patterns can be achieved by suitably selecting the refractive index of the bonding layer 48.

The present invention can be applied also to liquid crystal display apparatus of structures other than the structures shown in FIGS. 16 to 19 and also to other display apparatus which use a transparent electrode. Further, in the case of a liquid crystal display apparatus, it may be of any of the transmissive type, the reflective type and the transflective type. The second polarizing plate 62 may be a linearly polarizing plate or a circularly polarizing plate.

9. Working Example 1

As a more particular working example 1, the liquid crystal display apparatus 1 was manufactured under the following conditions:

Pixel size: 156×52(×3(RGB))μm

Pixel number: QVGA

Glass thickness: 0.5 mm

Liquid crystal mode: FFS

ITO was sputtered with a film thickness of 8 nm to the rear face of the second substrate 41 on the CF side, and then resist was applied and then exposure, development and etching processes were carried out using a photolithography method.

Thereafter, the electrode neighboring layer and the second polarizing plate 62 were pasted and evaluation by visual observation was carried out.

Results of the evaluation are listed in Table 1. Meanings of marks used in the table are indicated below the table.

TABLE 1

| Refractive index of glass | Refractive index of transparent electrode | Refractive index of bonding agent | Visibility (under fluorescent lighting) | Visibility (under sunlight) |
| --- | --- | --- | --- | --- |
| 1.52 | 1.81 | 1.47 | D | D |
| 1.52 | 1.81 | 1.49 | D | D |
| 1.52 | 1.81 | 1.52 | C | C |
| 1.52 | 1.81 | 1.55 | B | C |
| 1.52 | 1.81 | 1.60 | B | B |
| 1.52 | 1.81 | 1.62 | A | A |
| 1.52 | 1.81 | 1.68 | A | A |
| 1.52 | 1.81 | 1.70 | B | B |
| 1.52 | 1.81 | 1.74 | B | C |
| 1.52 | 1.81 | 1.81 | C | C |
| 1.52 | 1.81 | 1.84 | D | D |
| 1.52 | 1.81 | 1.90 | D | D |

A: almost invisible in all directions
B: almost invisible except regular reflection
C: a little visible also in other than regular reflection
D: visible in all directions

10. Working Example 2

In a working example 2, the liquid crystal display apparatus 1 was manufactured under the following conditions:

Pixel size: 156×52(×3(RGB))μm

Pixel number: QVGA

Glass thickness: 0.5 mm

Liquid crystal mode: FFS

ITO was sputtered with a film thickness of 8 nm to the rear face of the second substrate 41 on the CF side, and then resist was applied and then exposure, development and etching processes were carried out using a photolithography method.

Thereafter, a film of $SiO_x$ or $SiN_x$ was formed by a CVD method such that the refractive index was adjusted by varying the film formation temperature and the film formation rate.

Thereafter, the electrode neighboring layer and the second polarizing plate 62 were pasted and evaluation by visual observation was carried out.

Results of the evaluation are listed in Table 2. Meanings of marks used in Table 2 are same as those in Table 1.

TABLE 2

| Refractive index of glass | Refractive index of transparent electrode | Refractive index of protective layer | Visibility (under fluorescent lighting) | Visibility (under sunlight) |
| --- | --- | --- | --- | --- |
| 1.52 | 1.81 | 1.47 | D | D |
| 1.52 | 1.81 | 1.50 | D | D |
| 1.52 | 1.81 | 1.53 | C | C |
| 1.52 | 1.81 | 1.60 | B | B |
| 1.52 | 1.81 | 1.62 | A | A |
| 1.52 | 1.81 | 1.66 | A | A |
| 1.52 | 1.81 | 1.74 | B | C |
| 1.52 | 1.81 | 1.81 | C | C |
| 1.52 | 1.81 | 1.83 | D | D |

From the two working examples described above, it can be recognized that, where the refractive index of the second substrate 41 made of glass is set to 1.52 and the refractive index of the detection electrode 44 made of ITO is set to 1.8, the refractive index of the bonding layer 48 preferably ranges from 1.52 to 1.8, more preferably ranges from 1.6 to 1.7, and ideally ranges from 1.62 to 1.68.

11. Application Examples

Examples of an Electronic Apparatus

Now, application examples of the display apparatus described above in connection with the first to eighth embodiments of the present invention are described with reference to FIGS. 20A to 23B. The display apparatus according to the first to seventh embodiments described above can be applied to various electronic apparatus in various fields such as television apparatus, digital cameras, notebook type personal computers, portable terminal equipments such as portable telephone sets and video cameras. In other words, the display apparatus according to the first to seventh embodiments described above can be applied to various electronic apparatus in various fields wherein an image signal inputted to or produced in the electronic apparatus is displayed as an image. Here, application examples to principal electronic apparatus are described.

Figure 20A:
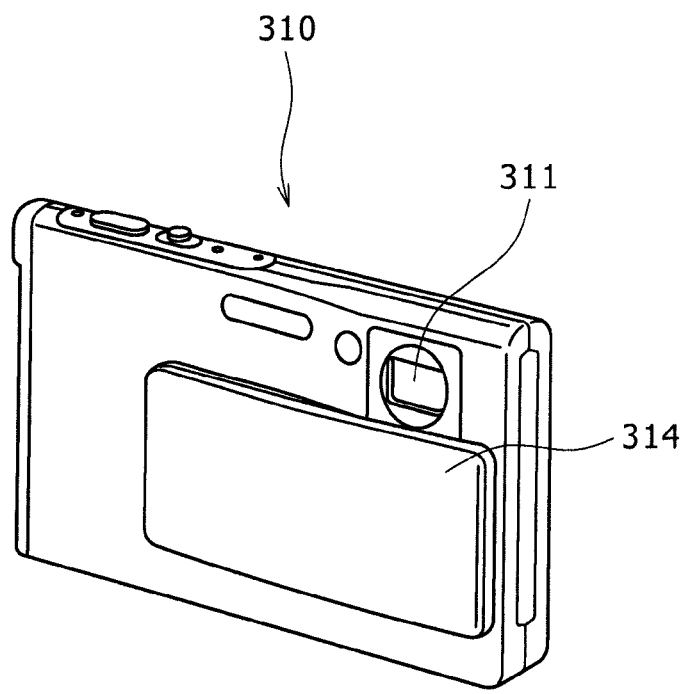
FIGS. 20A and 20B are perspective views, as viewed in different directions, showing a digital still camera which incorporates the liquid crystal display apparatus according to any one of the first to eighth embodiments of the present invention.
Figure 20B:
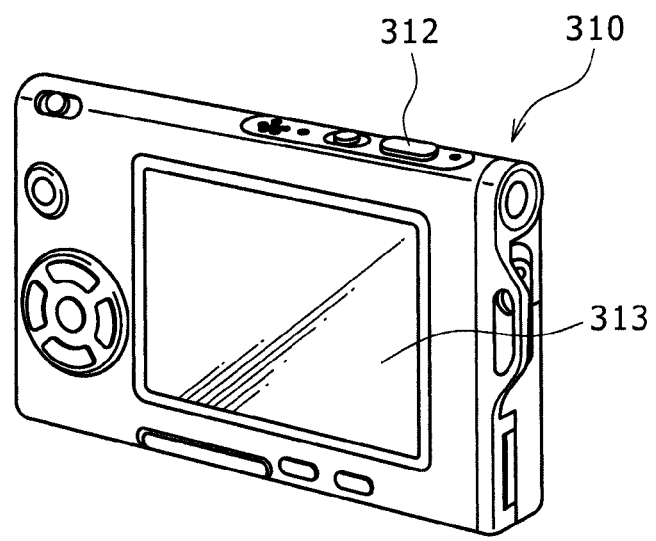

FIGS. 20A and 20B show a digital camera to which the present invention is applied, and more particularly, FIG. 20A is a front elevational view and FIG. 20B is a rear elevational view of the digital camera.

Referring to FIGS. 20A and 20B, the digital camera 310 shown includes an image pickup lens in a protective cover 314, a flash light emitting section 311, a display section 313, a control switch, a menu switch, a shutter 312 and so forth. The digital camera 310 is produced using any of the display apparatus having a display panel with a touch sensor described hereinabove in connection with the first to eighth embodiments as the display section 313.

Figure 21:
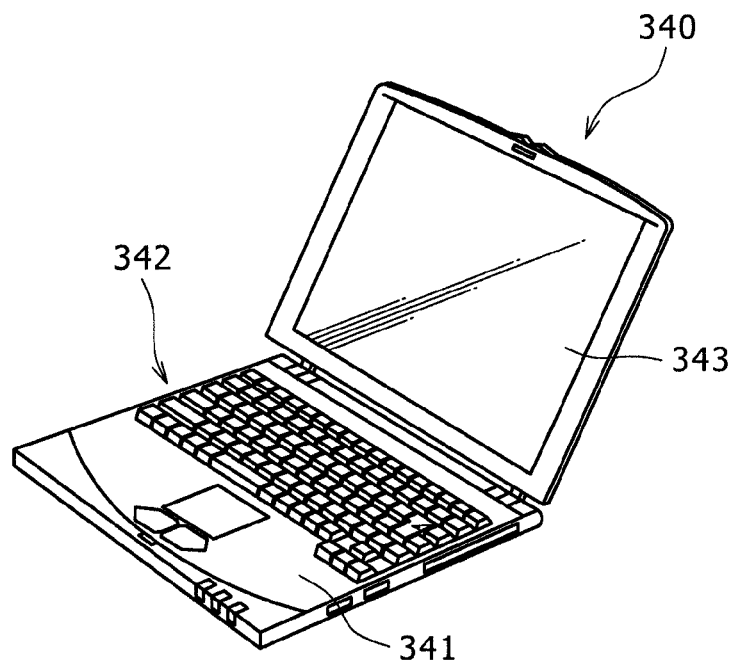
FIG. 21 is a perspective view showing a notebook type personal computer which incorporates the liquid crystal display apparatus according to any one of the first to eighth embodiments of the present invention.

FIG. 21 shows a notebook type personal computer to which the present invention is applied.

Referring to FIG. 21, the personal computer 340 shown includes a body 341, a keyboard 342 provided on the body 341 for being operated in order to input characters and so forth, and a display section 343 provided on a body cover for displaying an image. The personal computer 340 is produced using any of the display apparatus having a display panel with a touch sensor described hereinabove in connection with the first to eighth embodiments as the display section 343.

Figure 22:
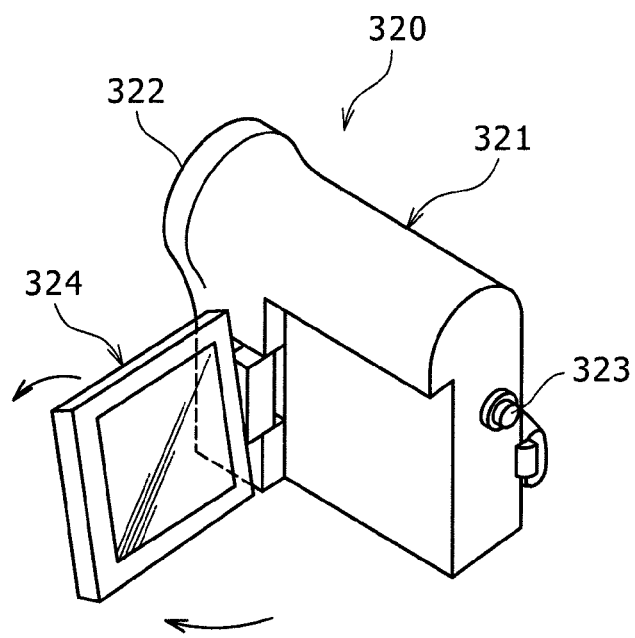
FIG. 22 is a perspective view showing a video camera which incorporates the liquid crystal display apparatus according to any one of the first to eighth embodiments of the present invention.

FIG. 22 shows a video camera to which the present invention is applied.

Referring to FIG. 22, the video camera 320 shown includes a body section 321, and a lens 322 provided on a side face of the body section 321 directed forwardly for picking up an image of an image pickup object, a start/stop switch 323 for image pickup, a monitor 324 and so forth. The video camera 320 is produced using any of the display apparatus having a display panel with a touch sensor described hereinabove in connection with the first to eighth embodiments as the monitor 324.

Figure 23A:
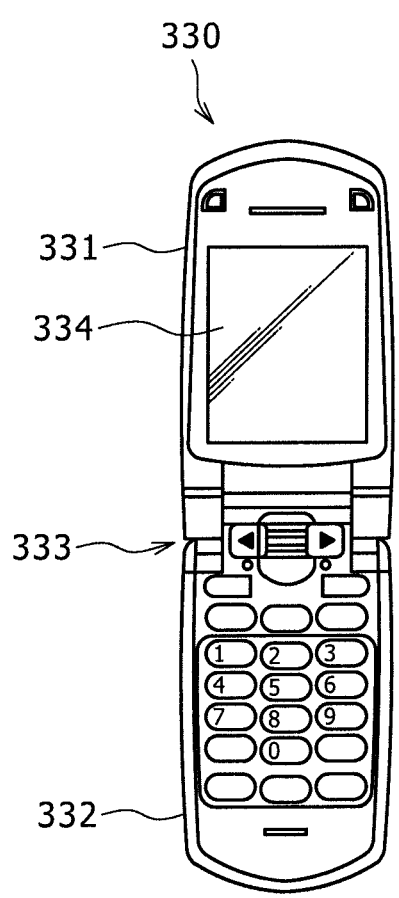
FIGS. 23A and 23B are front elevational views showing a portable terminal apparatus which incorporates the liquid crystal display apparatus according to any one of the first to eighth embodiments of the present invention in an unfolded state and a folded state, respectively.
Figure 23B:
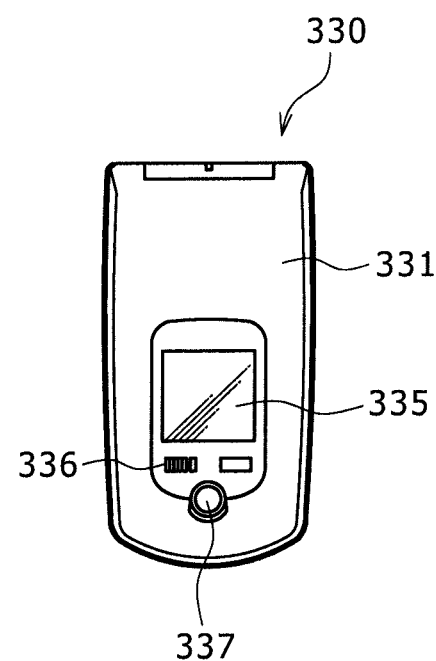

FIGS. 23A and 23B show a portable terminal apparatus to which the present invention is applied, and more particularly, FIG. 23A shows the portable terminal apparatus in an unfolded state and FIG. 23B shows the portable terminal apparatus in a folded state.

Referring to FIGS. 23A and 23B, the portable terminal apparatus 330 shown includes an upper side housing 331, a lower side housing 332, a connection section 333 in the form of a hinge section, a display 334, a sub display 335, a picture light 336, a camera 337 and so forth. The portable terminal apparatus 330 is produced using any of the display apparatus having a display panel with a touch sensor described hereinabove in connection with the first to eighth embodiments as the display section 334 or the sub display section 335.

In summary, according to the embodiments and the working examples of the present invention described above, a display apparatus can be provided which achieves invisualization of transparent electrode patterns in the entire display apparatus.

Further, a display apparatus with a touch panel wherein electrodes cannot be visually observed readily can be provided by arranging a refractive index adjustment layer such as the bonding layer 48 or the protective layer 45 between the detection electrodes 44.

Furthermore, according to the electronic apparatus of the application examples of the embodiments of the present invention, an electronic apparatus having a display apparatus which achieves invisualization of transparent electrode patterns in the entire display apparatus can be provided.

The present application contains subject matter related to those disclosed in Japanese Priority Patent Applications JP 2009-051296 and JP 2009-296074 filed in the Japan Patent Office on Mar. 4, 2009 and Dec. 25, 2009, respectively, and the entire contents of which is hereby incorporated by reference.

While preferred embodiments of the present invention have been described using specific terms, such description is for illustrative purposes only, and it is to be understood that changes and variations may be made without departing from the spirit or scope of the following claims.

What is claimed is:

1. A display apparatus, comprising:
   a first substrate and a second substrate disposed in an opposing relationship to each other;
   a plurality of pixel electrodes disposed adjacent one of two mutually opposing faces of said first and second substrates, with the one being of said first substrate;
   a displaying function layer adapted to exhibit an image displaying function based on an image signal supplied to said pixel electrodes;
   a driving electrode disposed in an opposing relationship to said pixel electrodes adjacent one of the two faces of said first and second substrates;
   a plurality of detection electrodes disposed on a face of said second substrate on the opposite side to said driving electrode and separated from each other in one direction so as to cooperate with said driving electrode to form capacitance therebetween; and
   an electrode neighboring layer disposed in contact with said second substrate and said detection electrodes and covering said detection electrodes;
   said electrode neighboring layer having a refractive index within a range from a refractive index equal to that of said second substrate to a refractive index equal to that of said detection electrodes, wherein, where a wavelength when a refractive index is defined is 550 nm, the refractive index of said electrode neighboring layer is within a range defined by −21% to +14% of the magnitude of the entire refractive index difference from the center of the refractive index difference between the refractive index of said second substrate and the refractive index of said detection electrode.

2. The display apparatus according to claim 1, wherein a refractive index na of said electrode neighboring layer has such a relationship to a refractive index np of said detection electrode and a refractive index ns of said second substrate as is given, where a wavelength when a refractive index is defined is 550 nm, by the following expression (1):

where $np \leq ns, np \leq na \leq ns$ where $np > ns, np \geq na > ns$     (1).

3. The display apparatus according to claim 1, wherein, where a wavelength when a refractive index is defined is 550 nm, the refractive index of said electrode neighboring layer is a middle value between the refractive index of said second substrate and the refractive index of said detection electrodes.

4. The display apparatus according to claim 1, wherein, where a wavelength when a refractive index is defined is 550 nm, the refractive index of said electrode neighboring layer is within a range defined from −14% to +7% of the magnitude of the entire refractive index difference from the center of the refractive index difference between the refractive index of said second substrate and the refractive index of said detection electrode.

5. The display apparatus according to claim 1, wherein said electrode neighboring layer is a bonding layer which adheres a polarizing plate or an optical functional layer including a polarizing plate to the face of said second substrate on which said detection electrodes are disposed.

6. The display apparatus according to claim 5, wherein said bonding layer is made of a compound containing one of silicon oxide and silicon nitride.

7. The display apparatus according to claim 1, wherein said electrode neighboring layer is formed from an orientation film provided as a ground layer of a coating type polarization material.

8. The display apparatus according to claim 1, wherein said electrode neighboring layer is a protective layer for protecting said detection electrodes.

9. The display apparatus according to claim 8, wherein said protective layer is made of one of silicon oxide and silicon nitride.

10. The display apparatus according to claim 8, wherein said protective layer is made of a compound containing one of silicon oxide and silicon nitride.

11. The display apparatus according to claim 1, wherein the area of a region in which said detection electrodes do not contact with the face of said second substrate in an effective display region of the face of said second substrate with which said detection electrodes contact is 20% or less of the effective displaying region.

12. The display apparatus according to claim 1, further comprising
a detection circuit capable of detecting a voltage variation through each of said detection electrodes.

13. The display apparatus according to claim 1, wherein said driving electrode is separated into a plurality of driving electrodes in a direction perpendicular to the separation disposition direction of said detection electrodes;
said display apparatus further comprising
a driving circuit for supplying a voltage to be used as a reference to a voltage to be applied to said displaying functional layer and a driving voltage for being used to detect that the capacitance exhibits a variation at some of said detection electrodes to said driving electrodes.

14. The display apparatus according to claim 1, wherein said display apparatus is a liquid crystal display apparatus having a liquid crystal layer as said displaying functional layer inserted between said first substrate and said second substrate.

15. The display apparatus according to claim 1, wherein the electrode neighboring layer is a bonding layer and a polarizing plate.

16. A display apparatus, comprising:
a first substrate and a second substrate disposed in an opposing relationship to each other;
a plurality of pixel electrodes disposed adjacent one of two mutually opposing faces of said first and second substrates, with the one being of said first substrate;
a displaying function layer adapted to exhibit an image displaying function based on an image signal supplied to said pixel electrodes;
a driving electrode disposed in an opposing relationship to said pixel electrodes adjacent one of the two faces of said first and second substrates;
a plurality of detection electrodes disposed on a face of said second substrate on the opposite side to said driving electrode and separated from each other in one direction so as to cooperate with said driving electrode to form capacitance therebetween; and
an electrode neighboring layer disposed in contact with said second substrate and said detection electrodes and covering said detection electrodes;
said electrode neighboring layer having a refractive index within a range from a refractive index equal to that of said second substrate to a refractive index equal to that of said detection electrodes, wherein said detection electrodes have an opening for exposing therethrough a pixel region to which a single color or a plurality of colors are allocated.

17. The display apparatus according to claim 16, wherein the opening is formed at each position of said detection electrodes for exposing a blue pixel region.

18. A display apparatus, comprising:
a first substrate and a second substrate disposed in an opposing relationship to each other;
a plurality of pixel electrodes disposed adjacent one of two mutually opposing faces of said first and second substrates, with the one being of said first substrate;
a displaying function layer adapted to exhibit an image displaying function based on an image signal supplied to said pixel electrodes;
a driving electrode disposed in an opposing relationship to said pixel electrodes adjacent one of the two faces of said first and second substrates;
a plurality of detection electrodes disposed on a face of said second substrate on the opposite side to said driving electrode and separated from each other in one direction so as to cooperate with said driving electrode to form capacitance therebetween; and
a protective layer disposed in contact with said second substrate and said detection electrodes and covering said detection electrodes;
a refractive index no of said protective layer having such a relationship to a refractive index np of said detection electrode and a refractive index ns of said second substrate as is given, where a wavelength when a refractive index is defined is 660 nm, by the following expression (2):

where $np \leq ns, np \leq no \leq s$ where $np > ns, np \geq no > ns$ (2), and further wherein, where a wavelength when a refractive index is defined is 550 nm, the refractive index of said electrode neighboring layer is within a range defined by −21% to +14% of the magnitude of the entire refractive index difference from the center of the refractive index difference between the refractive index of said second substrate and the refractive index of said detection electrode.

19. The display apparatus according to claim 18, wherein the refractive index of the protective layer is within a range defined to be from −14% to +7% of a magnitude of the entire refractive index difference from a center of the refractive index difference between the refractive index ns of said second substrate and the refractive index np of said detection electrode.

* * * * *